US012809035B2

(12) United States Patent

Haskin et al.

(10) Patent No.: US 12,809,035 B2

(45) Date of Patent: Nov. 24, 2026

(54) WAYFINDING USING DIRECT WIRELESS INTERFACE

(71) Applicant: Zoox, Inc., Foster City, CA (US)

(72) Inventors: Andrew Allen Haskin, San Francisco, CA (US); Pietro Leoni, San Francisco, CA (US); Maria Jose Perez Calvo, Redwood City, CA (US); Ishan Sain, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 84 days.

(21) Appl. No.: 18/896,572

(22) Filed: Sep. 25, 2024

(65) Prior Publication Data

US 2026/0086244 A1 Mar. 26, 2026

(51) Int. Cl.

*G01S 19/14* (2010.01)
*E05F 15/77* (2015.01)
(Continued)

(52) U.S. Cl.

CPC .............. *G01S 19/14* (2013.01); *E05F 15/77* (2015.01); *G01S 13/0209* (2013.01); (Continued)

(58) Field of Classification Search

CPC ...... G01S 19/14; G01S 13/0209; G01S 13/46; G01S 2013/468; E05F 15/77; B60R 25/245; E05Y 2900/531

See application file for complete search history.

(56) References Cited

U.S. PATENT DOCUMENTS

| | | | | |
|---|---|---|---|---|
| 6,298,306 B1 * | 10/2001 | Suarez | .................... | G01S 19/16 701/484 |
| 6,987,964 B2 * | 1/2006 | Obradovich | ............ | H04L 67/52 340/7.52 |

(Continued)

FOREIGN PATENT DOCUMENTS

| | | |
|---|---|---|
| JP | 2019002262 A | 1/2019 |
| JP | 2019031873 A | 2/2019 |

(Continued)

OTHER PUBLICATIONS

International Search Report and Written Opinion dated Jan. 13, 2026 for PCT International Application No. PCT/US2025/045585.

*Primary Examiner* — Gertrude Arthur Jeanglaude

(74) *Attorney, Agent, or Firm* — EIP US LLP

(57) ABSTRACT

Techniques are described herein for determining, based at least in part on a global positioning system associated with a user device, a user location and causing, based on the user location, the user device to display an indication of a vehicle location relative to the user location. Furthermore, receiving, via a direct wireless interface and based at least in part on the user being at or less than a first threshold distance from the vehicle, vehicle information, is described wherein the vehicle information comprises a direction between the user and the vehicle. It is further described to cause, based at least in part on the vehicle information, the user device to display an additional indication, wherein the additional indication is indicative of the vehicle location relative to the user location and a direction to follow for the user to reach the vehicle. Further causing, based at least in part on the user being at or less than a second threshold distance from the vehicle, opening of a door of the vehicle is described.

20 Claims, 5 Drawing Sheets

(51) Int. Cl.

| | |
|---|---|
| ***G01S 13/02*** | (2006.01) |
| ***G01S 13/46*** | (2006.01) |
| *B60R 25/24* | (2013.01) |

(52) U.S. Cl.

CPC ............. *G01S 13/46* (2013.01); *B60R 25/245* (2013.01); *E05Y 2900/531* (2013.01); *G01S 2013/468* (2013.01)

(56) References Cited

U.S. PATENT DOCUMENTS

| | | | | |
|---|---|---|---|---|
| 7,715,849 | B2 * | 5/2010 | Spirito | H04W 64/00 455/414.2 |
| 7,990,286 | B2 * | 8/2011 | Shankwitz | G01C 21/26 340/988 |
| 9,020,687 | B2 * | 4/2015 | Mendelson | H04W 64/006 701/31.5 |
| 9,299,255 | B2 * | 3/2016 | Yarnold | G08G 1/205 |
| 9,533,576 | B2 * | 1/2017 | Kalbus | H04W 4/046 |
| 2003/0046541 | A1 * | 3/2003 | Gerdes | H04W 12/068 713/168 |
| 2016/0096508 | A1 * | 4/2016 | Oz | H04L 67/125 701/36 |
| 2021/0097866 | A1 * | 4/2021 | Leary | G08G 1/205 |
| 2021/0407150 | A1 | 12/2021 | Czymontek et al. | |

FOREIGN PATENT DOCUMENTS

| | | | |
|---|---|---|---|
| JP | 2022134133 | A | 9/2022 |
| KR | 101514255 | B1 | 4/2015 |

* cited by examiner

WAYFINDING USING DIRECT WIRELESS INTERFACE

BACKGROUND

When calling for a ride, such as in a ride-sharing service, passengers may be presented with a location in which to meet the vehicle (e.g., for pickup). However, sometimes, the location alone may still lead to confusion on the part of the passenger such as in complex urban environments and where there are multiple ride-sharing vehicles proximate one another. Such confusion can lead to increased wait times, other delays, or potentially unsafe situations (e.g., where the vehicle is double-parked).

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
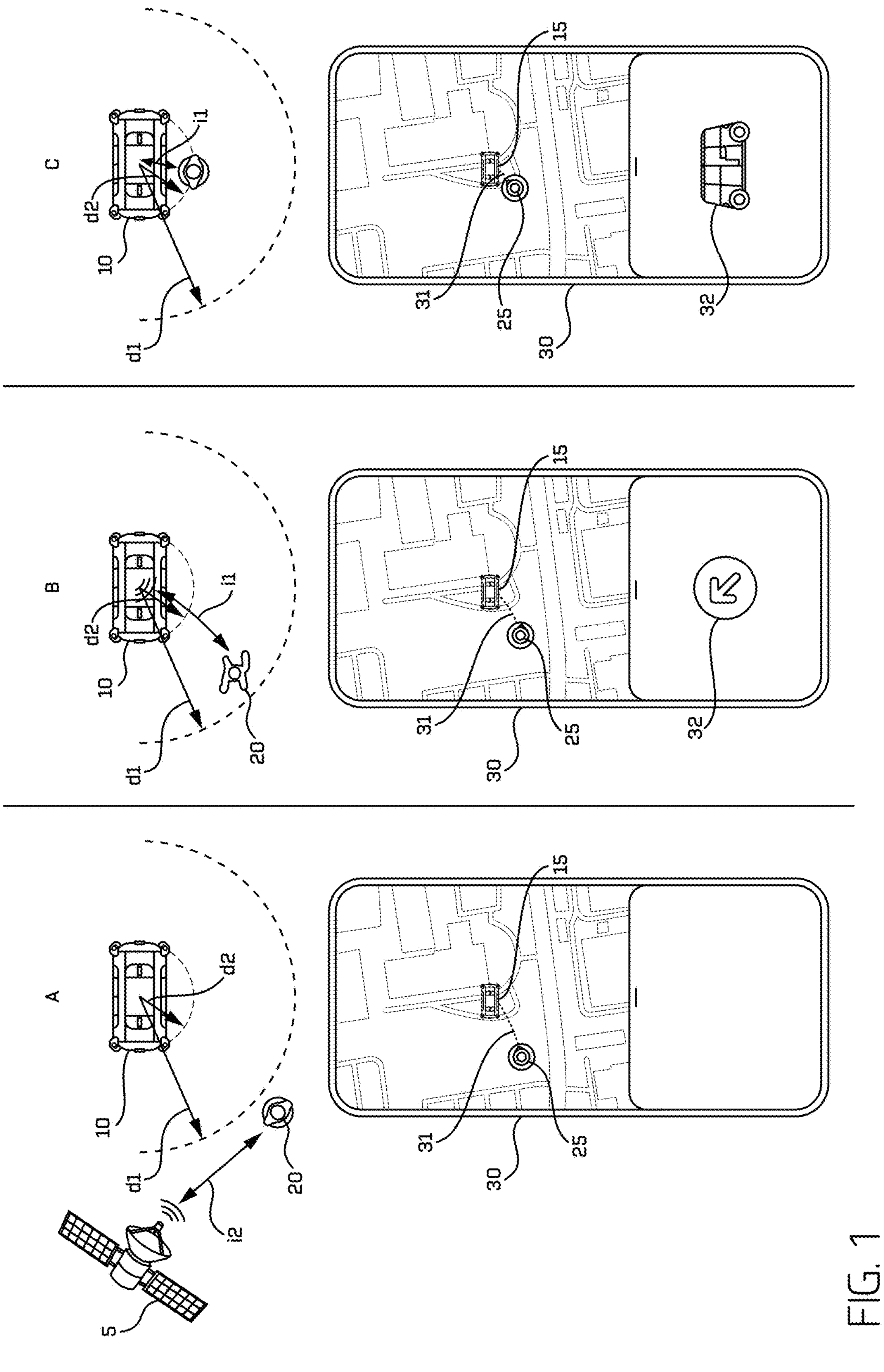
FIG. 1 is a pictorial diagram illustrating an example implementation for guiding a user toward a vehicle, in accordance with examples of the disclosure.

This disclosure presents techniques, e.g., methods and systems, for providing wayfinding for a user to reach a specific vehicle, such a specific autonomous vehicle (AV). For instance, if the specific vehicle is one in a long line of identical vehicles, it may be challenging for the user to correctly identify the specific vehicle. Satellite-based navigation may assist the user in limiting the number of possible vehicles, but generally lacks the accuracy to clearly indicate the one specific vehicle in the long line of identical vehicles. In addition to this, there may be situations where satellite-based navigation is unavailable, such as indoor or underground. To address these challenges, the disclosure presents a combination of technologies, including direct communication between e.g., a smartphone of a user and the vehicle. This may be utilized, not only guides the user accurately to the appointed vehicle, but also adds a layer of convenience and safety. Once the user is close enough to the vehicle, the system may for example automatically open the car door. The door-opening feature may further be designed with safety in mind, meaning that it only activates when you are in a safe position. For example, the door will not open if the user is standing too close to it, where there is a risk of being hit by the door as it opens, reducing a risk of discomfort to the user.

Satellite-based navigation systems, such as Global Positioning System (GPS), provide geolocation and time information to a receiver anywhere on or near the Earth. These systems use a network of satellites that transmit signals to determine the precise location of a user device by calculating the time it takes for the signals to reach the device. Other examples of satellite-based navigation are GLONASS, Galileo, and BeiDou. These systems operate similarly to GPS, offering global coverage and enhancing accuracy and reliability when used in conjunction with one another, a practice known as multi Global Navigation Satellite Systems (multi-GNSS) positioning. As used herein, the terms global positioning system or GPS may describe any satellite-based navigation system.

This disclosure is directed to techniques, procedures, as well as methods, systems and computer-readable media for providing wayfinding based on combinations of location information which may include a direct wireless interface between a user device and a specific vehicle. The direct wireless interface provides relative position data between the user device and the vehicle. Based on this relative position data, the user device may provide accurate guidance towards the specific vehicle, allowing the user to safely, securely and timely find the specific vehicle. The direct wireless interface may provide the relative position data independently or, or in addition to, position data provided by satellite-based systems.

As used herein, a user device, or user equipment (UE), may be any electronic device operated by, or servicing, a user within the scope of the present disclosure. A user device may be described as associated with a user. A user device may be exemplified by, but not limited to, smartphones, tablets, computers, wearable technology, or any other device that a user or person interacts with to perform certain tasks or access certain services.

A direct wireless interface, as used herein, may be any suitable direct wireless interface. The direct wireless interface may be exemplified by, but not limited to Ultra-Wideband (UWB), Bluetooth (BT), Wi-Fi, Near Field Communication (NFC), etc. For example, considering UWB, an UWB chip, or transceiver, in the user device communicates with a UWB system of the vehicle making it possible to comparably accurately determine a distance and direction of the user device relative to the vehicle using techniques such as Time of Flight (ToF). A foundational standard for UWB is provided in IEEE 802.15.4z, version 2020 of which is hereby incorporated by reference for all purposes. In addition, or alternatively, to UWB, Wi-Fi or BT may be used to comparably accurately determine the distance and direction of the user device relative to the vehicle through techniques like signal strength measurement or ToF. Bluetooth, particularly with Bluetooth Low Energy (BLE) and Bluetooth 5.1, may use received signal strength (RSSI) and Angle of Arrival (AoA) to estimate the distance and direction of between a user device and a vehicle. By measuring how strong the signal is and from which direction it arrives at multiple antennas on the vehicle or the user device, a BT system may triangulate the relative position of the user device and the vehicle. Wi-Fi, similarly, may use RSSI and more advanced methods like Wi-Fi Fine Timing Measurement (FTM) to determine the distance based on the time it takes for signals to travel between the vehicle and the user device. Generally, the accuracy of distance and direction provided by a UWB interface is superior to the accuracy provided by Wi-Fi or BT. In various protocols, additional information may also be embedded for transmission to the UE such as, for example, the vehicle identification number, style, etc.

In examples, a location of a user may be determined based on a satellite-based navigation systems such as those exemplified above. Further, vehicle information may be received by a user device via a first localization sensor of the user device. As indicated above, the user device is associated with a user. The vehicle information may be received based at least in part on the user being at or less than a first threshold distance from the vehicle.

The vehicle information may comprise any suitable information or data relating to e.g., the vehicle, or the user and the vehicle. The vehicle information may be provided as data packets received by the first localization sensor. The vehicle information may be provided directly from these data packets and/or obtained by determining e.g. a ToF of the data packets. Additionally, or alternatively, the vehicle information may be received, obtained, determined or otherwise acquired based, at least in part on physical properties of the stimuli received by the first localization sensor. Such physical properties of the stimuli may be an AoA or a wireless signal determined e.g., by phase differences between received stimuli at a plurality of detectors (antennas), a strength of the stimuli (e.g., an RSSI), etc. In some examples, the vehicle information comprises a distance between the vehicle and the user device, i.e., a distance between the vehicle and the user associated with the user device. Additionally, or alternatively, in some examples, the vehicle information comprises a direction between the user and the vehicle. The vehicle information may comprise the distance and/or direction directly, or, in some examples, an indication of the direction and/or an indication of the distance.

The first localization sensor may be comprised in the user device, or operatively connected to the user device. The first localization sensor may be any suitable sensor or transceiver configurable to e.g., form part of a direct wireless interface between a vehicle and the user device. In some examples, the first localization sensor is an UWB transceiver.

The first threshold distance may be a predetermined or configurable distance. In some examples, the first threshold distance is a distance determined by the first localization sensor being able to receive the vehicle information. To exemplify, if the first localization sensor is a UWB transceiver, the first threshold distance is a distance at which it is possible to establish a UWB link between the vehicle and the user device.

In examples, the user device may be caused to, based at least in part on the vehicle information, display an additional indication.

The additional indication may be indicative of a vehicle location relative to a user location and a directional path to follow for the user to reach the vehicle. The additional indication may be one or more of e.g., a directional arrow or other visual indication, an auditory indication, or a haptic indication, configured for indicating a direction between the user and the vehicle.

In examples, the user may be determined to be at or within a second threshold distance from the vehicle. This may be determined based at least in part on the vehicle information. The second distance is shorter than the first distance.

The second distance may be a predetermined or configurable distance. The second distance may be a distance at which commencing opening of a door of the vehicle will allow the user to reach the door of the vehicle about the same time as the door is fully opened. In some examples, the second distance may be determined based at least in part on a velocity or speed of the user, and/or an opening speed of the door. The opening speed of the door may be determined based, at least in part on an inclination of the vehicle. In some examples, the second distance is less than 4 m, such as less than 2 m.

In examples, the user may be determined to be outside a prohibited area of the vehicle and based at least in part on the user being outside the prohibited area and the user being within the second distance from the vehicle, a door of the vehicle may be caused to open.

The prohibited area may comprise any area at, or in a vicinity of the vehicle at which the user is at risk of discomfort and/or inconvenience, such as being hit by a moving door. Additionally, or alternatively, the prohibited area may comprise any area at, or in a vicinity of the vehicle, that the opening door may occupy.

In examples, the first localization sensor is a transceiver for an UWB interface, and the vehicle comprises a plurality of UWB devices arranged at predetermined specific location of the vehicle. Based at least in part on triangulation by the user device of the respective UWB devices, a location of the user in relation to the vehicle may be determined. The vehicle information may comprise the predetermined specific locations of the respective UWB devices.

The methods presented herein offer among other things, a more convenient, safer, and user-friendly way for a user to localize and optionally enter a specific vehicle. When navigating to a vehicle, such as a taxi or other specific vehicle, the use of an accurate relative distance technology offers numerous benefits. A comparably accurate relative distance between the specific user and the vehicle, provided by e.g., the direct wireless interface, enables accurate guidance of the user towards the vehicle. Furthermore, accessibility for people with disabilities is increased allowing also, e.g., people with reduced sight to conveniently locate the specific vehicle, those with mobility/dexterity issues the ability to enter without having to interact with any devices, etc. This allows for precise location tracking, enabling the user to accurately know where the specific vehicle is in relation to themselves, even in crowded or complex environments. This precision leads to, for instance, more efficient pickups, as also the vehicle may be configured to locate the user as they approach, minimizing the time spent searching for each other in busy areas such as airports etc. Additionally, as the user near the vehicle, features like automatic door unlocking may be safely activated without risking unwanted individuals entering the vehicle. This streamlines a boarding process and enhances convenience. The vehicle may also recognize arrival of the user and greet them with personalized settings, such as a preferred temperature or music, improving the overall user experience. Security may be heightened, as accurate relative distances may be utilized to increase a chance that only the user, i.e., the intended passenger, may interact with the vehicle, eliminating the need for physical keys or cards and offering a secure, contactless experience. Additionally, the user may benefit from real-time updates on the vehicle's approach, allowing the user to wait in a safe or comfortable location until the vehicle is very close. Further advantages include contextual awareness, such as automatically opening a trunk when the user approach from the rear with luggage. As indicated, this precision reduces a risk of errors by increasing a chance that the user is directed to the correct vehicle, avoiding confusion and mistakes. Safety is further enhanced because the vehicle may be configured to be aware of the location of the user, reducing the risk of accidents during pickup. For users with disabilities or limited mobility, accurate relative distance facilitates accessibility features like automatic door opening and precise vehicle positioning. In addition, this hands-free interaction further increases convenience by allowing the user to keep their phone stowed in e.g., a pocket or bag. When using ridesharing/ridehailing services, this precision facilitates a comparably smooth handover between an app and the vehicle, correctly matching the vehicle and driver with the user, and reducing driver distraction by allowing the driver to focus on driving rather than searching for the user. These benefits collectively improve at least the convenience, safety, and overall experience of navigating to a vehicle using accurate relative distance technology.

Examples are provided below with reference to FIGS. 1-5. Examples are discussed in the context of autonomous vehicles (AVs); however, the methods, apparatuses, and components described herein are not limited to autonomous vehicles. In one example, the techniques described herein may be utilized in driver-controlled vehicles.

FIG. 1 is a schematic diagram illustrating an example implementation of the techniques described herein, in embodiments and examples of the disclosure.

In FIG. 1, three different exemplary scenarios A, B, C are shown at which a user 20 is at different distances from a vehicle 10. The user 20 may be an intended passenger for an autonomous vehicle 10, and the difference scenarios A, B, C may describe the user 20 approaching the vehicle 10 at a pick-up location. An upper portion of each scenario in FIG. 1 shows the user 20 in relation to the vehicle 10. A lower portion shows a user device 30 associated with the user 20. An upper part of a display region of the user device 30 is exemplarily configured to indicate a route 31 (path, course, trajectory, etc.) from the user 20 to the vehicle 10. A lower portion of the display region of the user device 30 is exemplarily configured to indicate additional information, an additional indication. Additional information, as used herein, is to comprise any or all suitable supplementary details, information or data such as one or more additional indications.

At a first scenario A, the leftmost scenario in FIG. 1, the user 20 is located more than a first threshold distance d1 from the vehicle 10. A location of the user 20, i.e., a user location 25 as presented on a GUI of the user device 30, may, in the first scenario A, be determined based on data obtained across a second interface i2. The second interface i2 may be an interface between the user device 30 and a satellite-based navigation system 5. At the first scenario A, the user 20, or rather the user device 30, may receive satellite-based positioning data across the second interface i2 to determine the user location 25. The user device 30 may be configured to obtain and present a vehicle location 15 indicating a location of the vehicle 10. The vehicle location 15 may be provided via a cloud service or other backend functionality to which both the vehicle 10 and the user device 30 are operatively connected. In FIG. 1. the user device 30 is configured to indicate the vehicle location 15 and the user location 25, thereby providing an indication of a relation between the user location 25 and the vehicle location 15.

At the first scenario, the user location 25 is determined based on the satellite-based navigation system 5. Generally, this satellite-based navigation system 5 is comparably reliable in providing a comparably accurate user location 25. However, the satellite-based navigation system 5 is not capable of reliably providing a user orientation with accuracy. In order to determine a specific direction between the user 20 and the vehicle 10, iteration between two or more user locations 25 may be utilized if the user 20 is moving. However, this technique may still lack in accuracy. Further, assuming that the user 20 is standing still and turning around to locate themselves, a magnetometer or similar sensor device may provide compass services, allowing an orientation of the user 20, or rather the user device 30, to be determined. However, not all user devices 30 are provided with magnetometers or other sensors capable of providing a compass service. Furthermore, magnetometers are highly sensitive to all magnetic fields, not just the earth's magnetic field. Consequently, magnetometers are easily disturbed by nearby metallic objects, electronic devices, or strong magnetic fields, leading to inaccurate readings. As magnetic interference from building materials and electronic devices may significantly reduce an accuracy of magnetometer readings, magnetometers are less reliable for indoor navigation, reducing their use for applications requiring precise orientation in enclosed environments, such as a hotel lobby, or parking garage.

At the second scenario B in FIG. 1, the middle scenario, the user 20 is at or less than a first threshold distance d1, or first distance d1 for short, from the vehicle 10. The first threshold distance d1 may, as previously exemplified, be a predetermined or configurable distance. In some examples, the first threshold distance d1 is a distance determined by the user 20 being in range for establishing a direct link between the user device 30 and the vehicle 10 across a first interface i1. The first interface i1 may be any suitable direct wireless interface, such as those direct wireless interfaces exemplified herein. The first interface i1 may provide vehicle information to the user device 30. The vehicle information may comprise any suitable information, such as the information exemplified herein. In some examples, the vehicle information comprises a direction, or an indication of a direction, between the user device 30, i.e. the user 20, and the vehicle 10. The direction provided by the vehicle information may indicate, or be processed to provide, a direction from the user device 30 to the vehicle 10. Additionally, or alternatively, in some examples, the vehicle information may comprise a distance, or an indication of a distance, between the user 20 and the vehicle 10. The distance indicated by the vehicle information may indicate, or be processed to provide, a distance between the user device 30 to the vehicle 10. As indicated in scenario B of FIG. 1, the user device 30 may be configured to display an additional indication 32. The additional indication 32 may be determined, provided or otherwise based on the vehicle information. The additional indication 32 may be indicative of the vehicle location 15 relative to the user location 25 and a direction to follow for the user 20 to reach the vehicle 10. In the second scenario B of FIG. 1, the additional indication 32 is exemplified by an arrow indicating a direction toward the vehicle 10. The additional indication 32 may, in some examples, indicate the distance between the the user 20 to the vehicle 10. The user device 30 may be configured to be aware of a location within the user device 30 of a transceiver device used to provide a link across the first interface i1 in order to determine an orientation of the user device 30 and accurately present the additional indication 32, e.g. an arrow pointing toward the vehicle 10.

The additional indication 32 enables the user 20 to, regardless of presence and performance of a compass services, magnetic interference, to directly determine a direction toward the vehicle 10. The additional indication 32 may, as will be exemplified, be any suitable indication such as an auditory, or haptic indication, or combinations thereof. The additional indication 32 may enable the user 20 to securely, accurately and conveniently locate the vehicle 10.

It should be mentioned that the first interface i1 may additionally, or alternatively, provide user information which correspond to the vehicle information. The user information may be utilized by the vehicle 10, and/or services associated with the vehicle 10, determine e.g., a location, orientation, distance, movement, etc., of the user 20 in relation to the vehicle 10.

Based on e.g., the vehicle information, the user 20 may be determined to at or within a second threshold distance d2, or second distance d2 for short, from the vehicle 10. This is illustrated in a third scenario C in FIG. 1, the rightmost scenario. As seen in FIG. 1, the second threshold distance d2 is shorter than the first threshold distance d1. The second threshold distance d2 may, as previously exemplified, be a predetermined or configurable distance. When the user 20 is at or within the second threshold distance d2 from the vehicle 10, the vehicle 10 may be configured to perform one or more actions in response to this. In some examples, the vehicle 10 may be configured to open one or more doors of the vehicle 10 based on the user 20 being at or within the second threshold distance d2 from the vehicle 10.

In some examples, the vehicle location 15 may indicate a specific side of the vehicle 10 and not just a general location of the vehicle 10. In such examples, the additional indication 32 may indicate a direction for the user 20 follow in order to arrive at the indicated side of the vehicle 10. In some examples, the vehicle location 15 may indicate a specific door of the vehicle 10. In such examples, the additional indication 32 may indicate a direction for the user 20 follow in order to arrive at the indicated door of the vehicle 10.

The additional indication 32, as explained, indicates a direction between the user 20 and the vehicle location 15, or rather a direction for the user 20 to reach the vehicle 10, or the vehicle location 15. In some examples, the additional indication 32 may be based on further data exemplified by, but not limited to, traffic data, map data, weather data, etc. In examples wherein the additional indication 32 is based on map data, the obstacles such as benches, buildings, hedges, lawns etc., and paths such as roads, sidewalks, walkways, bicycle paths etc. may be considered when providing the additional indication 32. The additional indication 32 may, in such scenarios, not indicate the most direct to the vehicle location 15, but rather a comparably safe, convenient or scenic path to the vehicle location 15. Traffic data may be used to e.g., determine whether it is comparably safe to cross a road a specific location, or if a route via a pedestrian tunnel or bridge should be favored. Weather data may be used to determine if a direction with less exposure to rain, sun or wind should be favored.

In some examples, in order to e.g., cause a door of the vehicle 10 to open, additional authentication of the user 20 may be required. The additional authentication may be provided by data exchanged across the first interface i1, by physical properties provided by the first interface i1, by an authentication system, etc. In some examples, opening of a door of the vehicle 10 may depend on whether user authentication data indicate that the user 20 is authorized to access the vehicle 10 or not. This will be further explained in coming sections.

In FIG. 1, the vehicle 10 is indicated as being stationary at e.g., a pickup area and the user 20 is guided towards the stationary vehicle 10. However, the teachings presented herein are applicable also in situations where the vehicle 10 and the user 20 are moving, or in situations where the user 20 is stationary and the vehicle 10 is moving (in which case the vehicle 10 will use user information to navigate to the user 20). In examples where the vehicle 10 and the user 20 are moving, the user 20 may, when outside the first threshold distance d1, be guided towards a vehicle location 15 indicating a future vehicle location 15, i.e. an intended pickup area. This means that both the vehicle 10 and the user 20 are enroute towards the pickup area. However, it may be that, during the trip to the pickup area, the user 20 is at or within the first distance from the vehicle 10. For example, assume a pickup point at a west side of a square, both the vehicle 10 and the user 20 arrive at an east side of the square and a connection across an UWB interface between the user device 30 and the vehicle 10 is established. In this example, it may be more convenient to change the pickup location (the future vehicle location 15) to the east side of the square and provide an additional indication 32 guiding the user 20 the vehicle 10 at the updated location. Specifically, in some examples, the user device 30 may be configured to display the additional indication 32, wherein the additional indication is indicative of the updated vehicle location 15 relative to the user location 25 and the directional path to follow for the user 20 to reach the updated vehicle location 15. This may increase convenience for the user 20 and may reduce traffic by decreasing a distance traveled by the vehicle 10.

It should be noted that the additional indication 32 may, in some examples and scenarios indicate other information in addition to, or alternatively to, a direction to the vehicle 10. At the third scenario C, the additional indication 32 of the guiding arrow in the second scenario B is replaced with a view of the vehicle 10 illustrating which door that is open. This is one example, and indications relating prompting the user 20 to enter the vehicle 10. In some examples, the additional indication 32 may indicate a (visual) confirmation that the user 20 is at the correct vehicle 10, such as the vehicle's identification number or a matching color or icon. Additionally, or alternatively, the additional indication 32 may indicate a notification or such confirming that the vehicle 10 has recognized the user's presence and is ready for entry.

Figure 2:
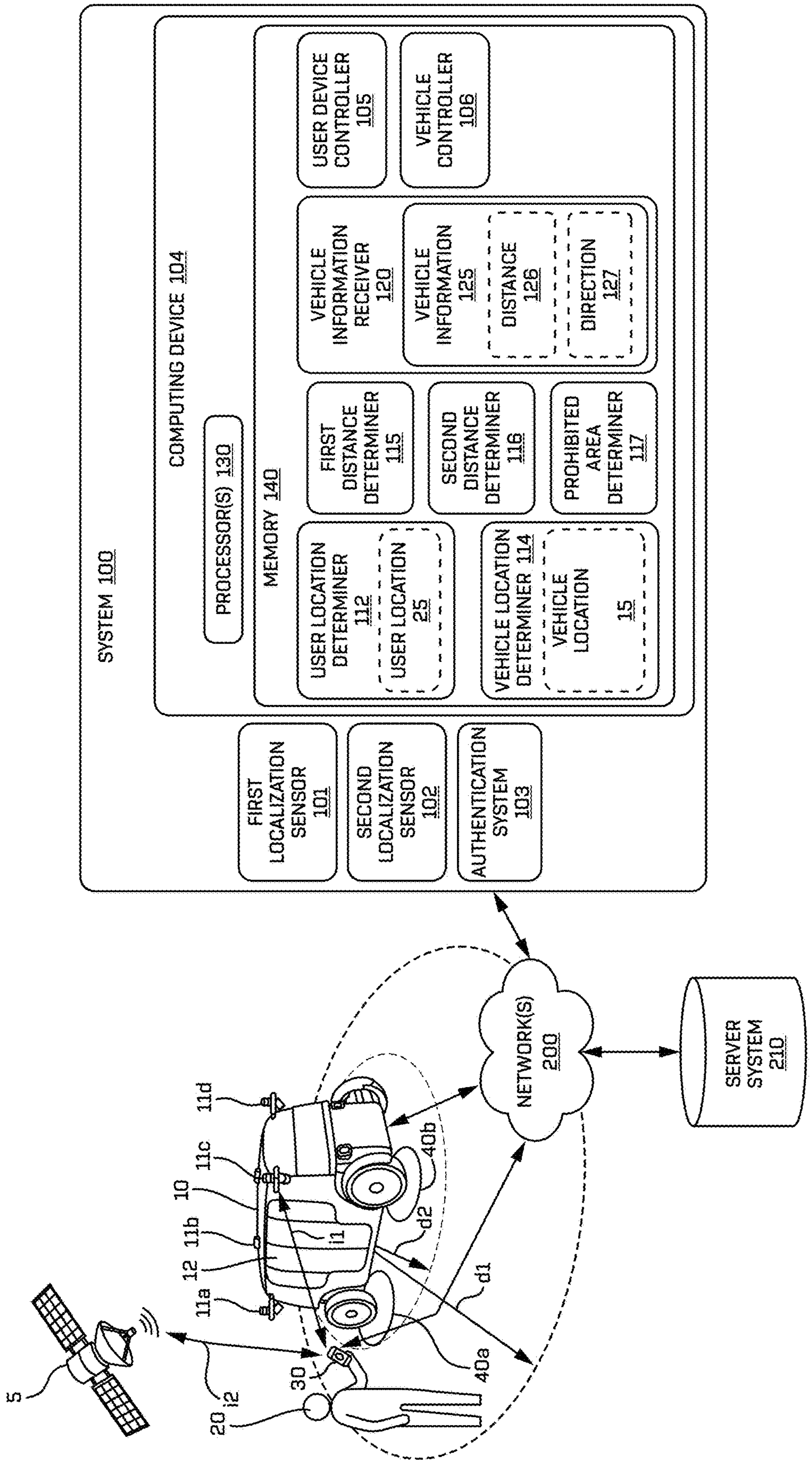
FIG. 2 is a schematic diagram illustrating an example implementation for guiding a user toward a vehicle, in accordance with examples of the disclosure.

FIG. 2 depicts a block diagram of an example system 100 for implementing the techniques described herein. Although some features may be not specifically mentioned in reference to the example system 100 of FIG. 2, the system 100 of FIG. 2 may be adapted to provide any feature, functionality or effect described herein.

The system 100 may be integrated in a vehicle 10, such as an AV or in a user device 30 as presented herein. However, the system 100 may in some examples be remote from the user device 30 and/or the vehicle 10 and operatively connected to the vehicle 10 and/or the user device 30. In some examples, the system 100 may be partly integrated in the user device 30, and partly remote from the user device 30, i.e. a distributed system 100. In some examples, the system 100 may be partly integrated in the vehicle 10, and partly remote from the vehicle 10. In some examples, at least a portion of the system 100 is integrated in the user device 30, and at least a portion of the system 100 is integrated in the vehicle 10. The system 100 may be wholly or partly integrated in a server system 210. The dividing and allocation of the system 100 is to comprise functionality and/or services, as well as physical hardware and system components. The system 100 may be operatively connected to the vehicle 10, the user device 30 and/or the server system 210 by one or more networks 200.

In the following, different features, services, functionality and devices associated with the system 100 will be described. It should be mentioned that these features, services, functionality and devices may be freely combined and that none of them are to be considered essential. Although the features, services, functionality and devices may be described as isolated blocks, this division if the features, services, functionality and devices is purely for explanatory and illustrative purposes and should be construed as limiting to the implementation of the teachings presented herein.

The system 100 comprises or is operatively connected to a computing device 104. The computing device 104 may be any suitable computing device 104 and comprise one or more processors 130. A processor 130 as used herein may be any suitable processer, processing circuitry, controller or control circuitry. The computing device 104 further comprises or is operatively connected to one or more memories 140. The memory 140 may comprise instructions executable by the processor(s) 130. These instructions, when executed, may cause the processor(s) to perform specific operations, functions and features. In the following, these operations, features and functions will be described in reference to the general system 100.

The system 100 in FIG. 2 comprises a user location determiner 112. The user location determiner 112 may be configured to determine the user location 25, i.e., a location of the user 20. The user location determiner 112 may be configured to determine the user location 25 by any suitable method, device or function and/or received from the user device 30 (as may be determined by any suitable, device, or function at the user device 30).

In some examples, the user location determiner 112 may determine the user location 25 by a first localization sensor 101. The first localization sensor 101 may be operatively connected to the system 100. The first localization sensor 101 may be a transceiver configured to establish, respond to, receive from, or otherwise form part of a direct wireless interface, e.g., the first interface i1, between the vehicle 10 and the user device 30. The first localization sensor 101 may be comprised in the user device 30. The direct wireless interface may be any suitable direct wireless interface, such as the direct wireless interfaces exemplified herein.

The first localization sensor 101 may be configured to form part of a first interfaces i1 with at least one transceiver 11*a*, 11*b*, 11*c*, 11*d* of the vehicle 10. In some examples, the vehicle 10 is provided with a plurality of transceivers 11*a*, 11*b*, 11*c*, 11*d* for operating at the first wireless interface i1. The transceivers 11*a*, 11*b*, 11*c*, 11*d* may be arranged at specific locations of the vehicle 10, such as, as illustrated in FIG. 2, at respective corners of the vehicle 10. In FIG. 2, the vehicle 10 is provided with four transceivers 11*a*, 11*b*, 11*c*, 11*d*, one arranged at each corner of the vehicle 10. This is one example, in some examples the vehicle 10 is provided with two or three transceivers 11*a*, 11*b*, 11*c*, 11*d*, and in some examples the vehicle 10 is provided with more than four transceivers 11*a*, 11*b*, 11*c*, 11*d* such as five, six, seven, eight or more transceivers. The transceivers 11*a*, 11*b*, 11*c*, 11*d* of the vehicle 10 may be arranged at any suitable location of the vehicle 10. In some examples, the transceivers 11*a*, 11*b*, 11*c*, 11*d* of the vehicle 10 are arranged spaced apart to increase a distance between the respective transceivers. The first localization sensor 101 may be configured to form part of respective first interfaces i1 (only one shown in FIG. 2) between two or more transceivers 11*a*, 11*b*, 11*c*, 11*d* of the vehicle 10 and the user device 30. The user location determiner 112 may be configured to triangulate the user location 25 based on the plurality of first interfaces i1 and the specific locations at the vehicle 10 of the respective transceivers 11*a*, 11*b*, 11*c*, 11*d* of the vehicle 10 forming part of the first interfaces i1.

In examples wherein the vehicle 10 has multiple transceivers 11*a*, 11*b*, 11*c*, 11*d*, e.g., UWB transceivers, first localization sensors 101 or such, located at specific points at the vehicle 10, the user device 30 equipped with a corresponding transceiver, i.e., corresponding localization sensor, may triangulate its position relative to the vehicle 10 by measuring the time it takes for signals to travel between the user device 30 and each of the vehicle's transceivers 11*a*, 11*b*, 11*c*, 11*d*. The user device 30 transmit pulses, which are received by the transceivers 11*a*, 11*b*, 11*c*, 11*d* on the vehicle 10. Each transceiver 11*a*, 11*b*, 11*c*, 11*d* may respond back to the user device 30. By calculating the ToF for each signal, the user device 30 may determine the distance to each transceiver. Since the exact locations of the vehicle's transceivers 11*a*, 11*b*, 11*c*, 11*d* are known, at least in relation to each other, the user device 30 may use these distance measurements to perform triangulation, accurately calculating its location in relation to the vehicle 10. The user device 30 may use intersection of the distances from multiple transceivers to pinpoint its location in three-dimensional space, providing precise relative positioning.

Additionally, or alternatively, in some examples, the user location determiner 112 may determine the user location 25 by a second localization sensor 102. The second localization sensor 102 may be operatively connected to the system 100. The second localization sensor 102 may be a transceiver configured to establish, respond to, or otherwise receive or obtain location data from a satellite-based navigation system 5. The second localization sensor 102 may be comprised in the user device 30. The satellite-based navigation system 5 may be any suitable satellite-based navigation system 5, such as the satellite-based navigation systems 5 exemplified herein. The second localization sensor 102 may be configured to operatively connect to the satellite-based navigation system 5 by the second interface i2.

In some examples, the user location determiner 112 may be configured to determine the user location 25 based at least in part on the second localization sensor 102 (e.g., based on data from a satellite-based navigation system 5). A user location 25 determined based at least in part on the second localization sensor 102 may be referred to as global location, i.e., a location of the user 20 on a global reference. The global location may be described using e.g., a geographic coordinate system, using latitude and longitude to specify a point on the Earth's surface, (often expressed in degrees, minutes, and seconds, or in decimal degrees for greater precision), a universal transverse mercator (UTM) system, which divides the world into a series of zones and provides coordinates in meters north and east of a central point within each zone, a military grid reference system (MGRS), etc.

In some examples, the user location determiner 112 may be configured to determine the user location 25 based at least in part on the first localization sensor 101 (e.g., based on the first interface i1, the direct wireless interface between the vehicle 10 and the user device 30). A user location 25 determined based at least in part on the first localization sensor 101 may be referred to as relative location, i.e., a location of the user 20 in relation to the vehicle 10. The relative location may comprise at least one of a relative distance 126 (distance for short) or a relative direction 127 (direction for short). The distance 126 may be expressed in meters or centimeters or any other suitable measure of distance, providing a comparably precise measure of how far apart the vehicle 10 and the user device 30 are. The direction 127 may be described using degrees relative to a reference point, such as true north or the user device's 30 current orientation, indicating an angle at which the vehicle 10 is located. For example, the relative location may state "3.5 meters at 45 degrees" to convey that the vehicle 10 is 3.5 meters away and 45 degrees to the right of the reference direction. Another option may involve Cartesian coordinates, where the relative position is described by X, Y, and Z coordinates, indicating horizontal, vertical, and depth distances between the user device 30 and the vehicle 10. Additionally, or alternatively, the relative location may be described in spherical coordinates. In spherical coordinates, the distance 126 between the user device 30 and the vehicle 10 may be the straight-line distance between the two, an azimuth may represent a horizontal angle from a reference direction, e.g., measured clockwise from true north, and an elevation (or altitude) may describe a vertical angle relative to a horizontal plane, indicating whether the vehicle 10 is above (uphill, at a higher floor, etc.) or below (downhill, at a lower floor, etc.) the user device 30. In specific example, the relative location may indicate the location of the vehicle 10 in relation the user device 30 as "4 meters distance, 30 degrees azimuth, 10 degrees elevation," meaning the vehicle 10 is 4 meters away, 30 degrees clockwise from north, and 10 degrees above the horizontal plane. In the example of spherical coordinates, the direction 127 comprises at least the azimuth.

In some examples, the user location determiner 112 is configured to determine the user location 25 based at least in part on content of data packets transmitted and/or received across the first interface i1. Such content may be exemplified by, but not limited to a timestamp of transmission and/or reception (to facilitate ToF calculations), a vehicle location 15 (in any format), etc. In some examples, the user location determiner 112 is configured to determine the user location 25 based at least in part on physical parameters associated with reception of signals by the first localization sensor 101. Such physical parameters may be exemplified by, but not limited to, AoA, RSSI, etc. To exemplify, assuming the first interface i1 is an UWB interface, the user location 25 may be determined by measuring the time it takes for UWB signals to travel between the user device 30 and the vehicle 10. This may be facilitated by the devices exchanging timestamped pulses of radio waves, and by calculating the ToF of these signals, the user location determiner 112 may accurately determine a distance between the user device 30 and the vehicle 10. From the physical layer, e.g., by detecting timing difference between reception at different antennas of the first localization sensor 101, the AoA of the radio waves may be determined. The AoA indicates a direction between the user device 30 and the vehicle 10. The user location determiner 112 may be configured to combine the distance with the directional information, and thereby determine the relative location of the user device 30 in relation to the vehicle 10. In some examples, the user location determiner 112 may be configured to only determine one of the distance or the direction between the user device 30 and the vehicle 10.

It should be mentioned that the user location determiner 112 may be configured to repeatedly determine the user location 25 such that the user location 25 may be repeatedly updated by the user location determiner 112. As used herein, an updated user location 25 indicates a more recent user location 25 compared to a previously referenced user location 25. The updated user location 25 is not necessarily, but it may be, the next user location 25 after the previously referenced user location 25. The updated user location 25 is not required to, but it may be, determined by the same localization sensor 101, 102 as the user location 25. In some examples, the updated user location 25 may be determined based at least in part on the first localization sensor 101 and the user location 25 may be determined based only on the second localization sensor 102 or vice versa.

The system 100 in FIG. 2 comprises a vehicle location determiner 114. The vehicle location determiner 114 may be configured to determine the vehicle location 15, i.e., a location of the vehicle 10. The vehicle location determiner 114 may be configured to obtain the vehicle location 15 from the vehicle 10. The vehicle location 15 may be obtained via any suitable interface such as the first interface i1, the second interface i2 and/or the network 200. The vehicle location 15 may be described as a global vehicle location and/or a relative vehicle location, corresponding to the global and relative user locations. In some examples, the vehicle 10 is provided with a receiver for satellite-based navigation. This means that the vehicle 10 is aware of its global location and this may be provided to the user device 30 via the direct wireless interface, the first interface i1. In examples wherein the first interface i1 is direct wireless interface such as a UWB interface, the vehicle location 15 may be provided to the vehicle location determiner 114 as a data packet transferred across the direct wireless interface. In situations wherein a connection across the first interface i1 is not established, or the first interface i1 is unable to transfer the vehicle location 15, the vehicle 10 may provide the vehicle location 15 to the server system 210 via e.g. the network, and the vehicle location determiner 114 may obtain the vehicle location 15 from the server system 210, via e.g. the network 200.

Depending on the configuration of the system 100, and whether the user device 30 is guided towards the vehicle 10 and/or the vehicle 10 is guided towards the user device 30, the vehicle location determiner 114 may be configured to determine the vehicle location 15 correspondingly to the user location determiner 112 determining the user location 25 and vice versa.

The system 100 may further comprise a vehicle information receiver 120. The vehicle information receiver 120 may be configured to receive, detect, determine or otherwise obtain vehicle information 125. The vehicle information receiver 120 may be configured to obtain the vehicle information 125 from any suitably source, via any suitable interface(s). In some examples, the vehicle information receiver 120 is configured to obtain vehicle information 125 via the network 200. Additionally, or alternatively, the vehicle information receiver 120 may be configured to obtain vehicle information 125 via the first interface i1. In some examples, the vehicle information receiver 120 may be configured to obtain a portion of the vehicle information from the user location determiner 112 and a portion of the vehicle information 125 via the network 200. To exemplify, assume that the first interface i1 is an UWB interface and that the vehicle information receiver 120 obtains vehicle information 125 from user location determiner 112. In some examples, the vehicle information 125 may comprise the distance 126 between the vehicle 10 and the user device 30 and/or the direction 127 between the user device 30 and the vehicle 10, both of which may be provided by the user location determiner 112 as exemplified above. The vehicle information 125 may, additionally or alternatively, comprise the vehicle location 15. The vehicle location 15 may be provided by the vehicle location determiner 114. In some examples, the vehicle information 125 may comprise an orientation of the vehicle 10, indicating in which direction the vehicle 10 is facing. In some examples, the vehicle 10 may be moving and the vehicle information 125 may comprise a heading or a bearing of the vehicle 10. This may assist the user 20 in understanding how the vehicle 10 is positioned in relation to them. Additionally, or alternatively, the vehicle information 125 may indicate which entry, i.e., which door 12 of the vehicle 10, that is closest to the user 20, which may further enhance convenience and efficiency. In some examples, the vehicle information 125 may indicate one or more doors 12 of the vehicle 10 which are prohibited for entry by the user 20. Doors 12 prohibited for entry may be prohibited due to traffic conditions, physical objects in the vicinity of the vehicle 10 making entry through a prohibited door 12 challenging, malfunction, etc. The vehicle information 125 may, in some examples, further comprise or otherwise indicate real-time updates on movement of the vehicle 10, such as speed and estimated time of arrival at the user's location or a predetermined pickup location. The vehicle information 125 may assist in providing a substantially complete picture of the relative position of the vehicle 10 and user 20 and thereby assist the user 20 in anticipating when and where to most conveniently meet the vehicle 10.

In some examples, the vehicle information 125 may comprise authentication data associated with the vehicle 10 and/or the user 20. In some examples, when the user 20 approaches the vehicle 10, or is within a predetermined or configurable distance from the vehicle 10, the vehicle 10 may transmit a secure signal to the user device 30, requesting authentication. This request may be sent across the first interface i1. The request may be configured to trigger automatically when the user 20 is within a certain range, relying on e.g., the proximity data provided by UWB. The user device 30 may be configured to respond to the request, via the same or a different interface (e.g., the network 200) with a pre-configured digital key or authentication token. In some examples, the pre-configured digital key or authentication token is securely transmitted back to the vehicle 10 via e.g., an encrypted BLE connection. The vehicle 10 may verify this token against credentials stored at the vehicle 10, or credentials obtained from the server system 210. If the authentication is successful, it allows access or enables specific functions, like unlocking the doors 12 and/or opening the doors 12. Consequently, the techniques described herein allows to user device 30 to cause, based at least in part on that the user 20 is permitted to enter the vehicle 10, opening of the door 12 of the vehicle 10. In some examples, the authentication process may be encrypted to ensure security and prevent unauthorized access.

In some examples, the system 100 may comprise an authentication system 103 operable to e.g., assist in authentication of the user 20 before the vehicle 10. The authentication system 103 may be configured to facilitate some, or all, of the authentication steps described above in reference to the vehicle information 125. In some examples, the authentication system 103 is an authentication system 103 of the user device 30 configured to provide user authentication data indicating whether the user 20 is permitted to enter the vehicle 10 or not. In such examples, the authentication system 103 may be one or more of a short-range wireless (e.g., NFC, BLE, etc.) system, an optical authentication system and/or a biometric authentication system. To exemplify, to authenticate the user 20 before the vehicle 10 using NFC, the user 20 may tap, touch or approach, the user device 30 to an NFC reader on the vehicle 10. This may trigger an exchange of a secure, encrypted digital key stored on the user device 30, which may verify an identity of the user 20, and/or permissions associated with the user 20. In an optical authentication system, a camera of the vehicle 10, or a dedicated optical sensor, may scan a QR code or other optical pattern displayed on the user device 30, matching it against a pre-registered code to grant access. Alternatively, a display at the vehicle 10, or a sticker at the vehicle 10, may present the QR code or another optical pattern which may be scanned by the user device 30. In response to scanning the QR code or other optical patterns, and based on data obtained from the scanning, the authentication system 103 may be configured to generate a token that may be transferred to the vehicle 10 for authentication of the user 20. With a biometric authentication system, the user's fingerprint, face, or other biometric data may be verified by the mobile device, and upon successful authentication, the mobile device 30 may transmits an encrypted signal or digital key to the vehicle 10, confirming an identity of the user 20, allowing the vehicle 10 to verify the identity and potentially grant access or control to the vehicle 10.

In some examples, the system 100 may further be configured with a first distance determiner 115. The first distance determiner 115 may be configured to determine if the user 20 is at or within the first threshold distance d1 from the vehicle 10. In some examples, the first distance determiner 115 is configured to determine if the user 20 is at or within the first threshold distance d1 from the vehicle 10 or not based on the first localization sensor 101. In some examples, the first distance determiner 115 may be configured to determine that the user 20 is at or within the first threshold distance d1 based on vehicle information 125 received via the first localization sensor 101. In some examples, the first distance determiner 115 may be configured to determine that the user 20 is at or within the first threshold distance d1 responsive to the first localization sensor 101 being able to sense, measure, detect or otherwise obtain a signal from the vehicle 10. For example, if the first interface i1 is an UWB interface and the first localization sensor 101 is an UWB transceiver, the first distance determiner 115 may be configured to determine that the user 20 is at or within the first threshold distance d1 responsive to the UWB transceiver establishing an UWB connection to the vehicle 10. Corresponding examples may be made based on any other suitable first interface i1. In some examples, the first distance determiner 115 may be configured to determine if the user 20 is at or within the first threshold distance d1 based on the vehicle information 125. The first distance determiner 115 may be configured to compare the distance 126 provided or otherwise indicated by the vehicle information 125 to the first threshold distance d1 and determine that the user 20 is at or within the first threshold distance d1 based on the comparison. Correspondingly, in some examples, the first distance determiner 115 may be configured to determine if the user 20 is outside first threshold distance d1 from the vehicle 10 based on the vehicle information 125, the first localization sensor 101, etc. In some examples, the first distance determiner 115 may be configured to determine if the user 20 is outside the first threshold distance d1 from the vehicle 10 based on a comparison between the global location of the user 20 and the global location of the vehicle 10.

In some examples, the system 100 may further be configured with a second distance determiner 116. The second distance determiner 116 may be configured to determine if the user 20 is at or within the second threshold distance d2 from the vehicle 10. In some examples, the second distance determiner 116 is configured to determine if the user 20 is at or within the second threshold distance d2 from the vehicle 10 or not based on the first localization sensor 101. In such examples, the second distance determiner 116 may be configured to determine that the user 20 is at or within the second threshold distance d2 based on vehicle information 125 received via the first localization sensor 101. The second distance determiner 116 may be configured to compare the relative distance 126 of, or indicated by, the vehicle information 125 to the second threshold distance d2.

In some examples, the system 100 may be configured with a prohibited area determiner 117. The prohibited area determiner 117 may be configured to determine whether the user 20 is at or within one or more prohibited areas 40*a*, 40*b* (prohibited zones) at the vehicle 10. Prohibited areas 40*a*, 40*b* as used herein, refer to specific zones, regions or locations around the vehicle 10 where it is inappropriate or even unsafe for a user 20 to be located when e.g., the doors 12 are in motion. Prohibited areas 40*a*, 40*b* may indicate spaces at or next to the door's path of movement, such as the side or rear areas where sliding or hinged doors 12 may swing open. One purpose of identifying and monitoring these prohibited areas 40*a*, 40*b* is to reduce a risk of potential harm or injury that may occur if a user 20 is standing too close to the moving parts of the vehicle 10, such as being struck by the door 12 as it opens. By detecting when a user 20 is in these prohibited areas 40*a*, 40*b*, the system 100 may delay or prevent the doors 12 from opening until the user 20 has moved to a safe distance, ensuring that the automatic door 12 operation does not inadvertently cause an accident. This safety feature enhances the overall security and user experience by providing a more intelligent and considerate interaction between the user 20 and the vehicle 10, reducing the risk of injury and promoting safer use of the vehicle's automated systems.

The prohibited area determiner 117 may determine whether the user 20 is at or within a prohibited area 40*a*, 40*b* based on the vehicle information 125, specifically the distance 126 and the direction 127 which will provide a location of the user 20 in relation to the vehicle 10. In examples wherein the vehicle 10 comprises more than one transceiver 11*a*, 11*b*, 11*c*, 11*d*, the prohibited area determiner 117 may utilize distances 126 provided by the transceivers 11*a*, 11*b*, 11*c*, 11*d* to determine whether the user 20 is at or within a prohibited area 40*a*, 40*b*. The user device 30 may, e.g., based on the vehicle information 125, the first localization sensor 101 etc., be configured to determine that the user 20 is at or less than the second threshold distance d2 from the vehicle 10. Additionally, or alternatively, the user device 30 may, e.g., based on the vehicle information 125, be configured with data indicating prohibited areas 40*a*, 40*b* associated with the vehicle 10, and the user device 30 may determine that the user 20 is at a safe area, i.e., an area that is outside the prohibited areas 40*a*, 40*b*.

Prohibited areas 40*a*, 40*b* may, as previously indicated, comprise certain zones that are identified as unsafe for door operation if a user 20 is present there. For instance, if a user 20 is standing directly next to a door 12, whether it's a front, rear, or sliding door, and within the path that the door 12 would occupy when opened, the door 12 should not be allowed to open to prevent potential discomfort of the user 20 from contact with the moving door 12. The prohibited areas 40*a*, 40*b* may be areas beside hinged doors where they swing outward, a space alongside sliding doors where they move backward or forward, and/or zones under gull-wing or upward-opening doors where the door rises and could strike someone standing too close. However, other areas at the vehicle 10 may be determined as prohibited areas 40*a*, 40*a*. For instance, if a user 20 is standing near the front or rear of the vehicle 10, initiating engine start or activating autonomous driving features like self-parking may pose discomfort and stress to the user even if there is no actual risk of physical harm to the user. Also, in examples wherein the vehicle 10 comprises a combustion engine, being close to the vehicle's exhaust when the engine is running may expose the user to harmful emissions and high temperatures. Areas around deployable features such as retractable running boards, motorized mirrors, or aerodynamic elements like spoilers may also be uncomfortable to be at for a user when these features are activated.

In some examples, prohibited areas 40*a*, 40*b* may be determined not only based on e.g., movement of the door 12, but also movement of the user 20. For instance, assume that a user 20 is outside an area which the moving door (or any other moving component) will occupy during opening but moving. By estimating a likely path for the user, based e.g., at least in part on the vehicle information 125, the prohibited area determiner may determine that, with a degree of certainty, there is a risk that the user 20 will pass the area which the moving door will occupy during opening. That is to say, the prohibited area determiner 117 may adjust, tune or otherwise modify the prohibited areas based on the vehicle information 125.

The system 100 may, in some examples, be configured with a user device controller 105. The user device controller 105 may be configured to control the user device 30 based on any data, function or feature provided by the system 100. The user device controller 105 may be configured to control any suitable operation of the user device 30, such as, but not limited to, activation of the first and/or second localization sensors 101, 102. The user device controller 105 may, in some examples, be configured to cause the user device 30 to activate, operate or otherwise utilize one or more features provided by authentication system 103. The user device controller 105 may, additionally or alternatively, be configured to cause the user device 30 to provide the additional indication 32. To exemplify, the user device controller 105 may, based on e.g., the vehicle information 125, cause the user device 30 to present the additional indication 32. The additional indication 32 may be presented graphically, haptically and/or auditorily.

As mentioned, the vehicle information 125 may comprise or otherwise indicate a direction 127 between the user 20 and the vehicle 10. In such examples, the user device controller 105 may be configured to cause the user device 30 to provide one or more additional indications 32 comprising or otherwise indicating the direction 127 between the user 20 and the vehicle 10. The direction 127 may be presented in the form of an arrow on a display of the user device 30 as exemplified in FIG. 1. Additionally, or alternatively, the direction 127 may be presented as auditory feedback comprising one or more of voice queues, or frequency-controlled signals where the direction 127 is indicated either by a frequency of a signal pulses, i.e., how often the pulses are sounded, and/or a frequency of an audio signal, i.e., a pitch of the audio signal. Additionally, or alternatively, the direction 127 may be presented as haptic feedback wherein the user device 30 may be controlled to vibrate or otherwise haptically indicate the direction 127 between the user 20 and the vehicle 10. In some examples, the user device controller 105 may be configured to provide one or more additional indications 32 comprising the distance 126 between the vehicle 10 and the user 20. Also the distance 126 may be presented correspondingly to the direction 127, i.e., visually (numerically and/or graphically), haptically and/or acoustically.

In some examples, the vehicle information 125 comprises both a distance 126 between the user 20 and a direction 127 from the user 20 toward the vehicle 10. In such examples, the additional indicator 32 may comprise verbal ques conveying both the distance 126 and the direction 127 such as, "Your ride is eight meters to your right" or "Your ride is twelve meters straight ahead" or in case of obstacles along the way "Please walk five meters straight ahead and then turn to the left".

In some examples, the user device controller 105 is configured to cause the user device 30 to present the additional indication 32 based on the vehicle information 125, the first distance determiner 115, the second distance determiner 116, and/or the prohibited area determiner 117. In some examples, the user device controller 105 is configured to, based on the prohibited area determiner 117 determining that the user 20 is at or within a prohibited area 40*a*, 40*b*, cause the user device 30 to present additional indication 32 comprising an indication indicating that the user 20 is at or within a prohibited area 40*a*, 40*b*.

The system 100 may, in some examples, be configured with a vehicle controller 106. The vehicle controller 106 may be configured to cause control and/or operation of the vehicle 10. The vehicle controller 106 may be configured to control, or cause control of, the vehicle 10 based on any data, function or feature provided by the system 100. The vehicle controller 106 may be configured to control any suitable operation of the vehicle 10, such as, but not limited to, activation of the first and/or second localization sensors 101, 102, causing unlocking and/or opening of one or more doors 12, provide visual or auditory feedback.

In one specific example, a user 20 is moving towards a vehicle location 15. The user device controller 105 is configured to, based in the first distance determiner 115 determining that the user 20 is outside the first threshold distance d1 from the vehicle 10, cause the user device 30 to present the user location 25 (the global user location), determined by the user location determiner 112 and the vehicle location 15 (the global vehicle location), determined by the vehicle location determiner 114. The user device controller 105 may further cause the user device 30 to present a path from the user location 25 to the vehicle location 15. The user 20 may follow the indicated path and upon the first distance determiner 115 determining that the user 20 is at or within the first threshold distance d1 from the vehicle 10, the user device controller 105 may be configured to cause the user device 30 to present additional indication 32 in the form of a graphical arrow indicating the direction 127 (obtained by the vehicle information receiver 120) between the user 20 and the vehicle 10. The user 20 may follow the direction provided by the additional indication 32, and upon the second distance determiner 116 determining that the user 20 is within the second threshold distance d2 from the vehicle 10, the user device controller 105 may be configured to cause the additional indication 32, additionally or alternatively, to indicate a specific door 12 of the vehicle 10 for ingress to the vehicle 10 and the graphical arrow to guide the user 20 to the specific door 12. The vehicle controller 106 may be configured to cause the vehicle 10 to indicate, at e.g., a display device or other optical device, at the doors 12 of the vehicle 10, which doors 12 that are permitted for ingress, and which doors 12 that are not permitted for ingress. Such indication may be provided in the form of descriptive icons and/or differently colored light. The user 20 may follow the guidance provided by the additional indication 32 and responsive to the prohibited area determiner 117 determining that the user 20 is at or within a prohibit area 40*a*, 40*b*, the user device controller 105 may be configured to cause the user device 30 to present additional indication 32 indicating to the user 20 that they are at or within a prohibit area 40*a*, 40*b*. The user 20 may, based on the additional indication 32, notice that they are at or within a prohibit area 40*a*, 40*b* and move away from the prohibited area 40*a*, 40*b*. Responsive to the prohibited area determiner 117 determining that the user 20 is outside the prohibited area 40*a*, 40*b* and the second distance determiner 116 determining that the user 20 is at or within the second threshold distance d2 from the vehicle 10, the user device controller 105 may cause the user device 30 present additional indication 32 indicating that a door 12 of the vehicle 10 will be opened. The vehicle controller 106 may, responsive to the prohibited area determiner 117 determining that the user 20 is outside the prohibited area 40*a*, 40*b*, the second distance determiner 116 determining that the user 20 is at or within the second threshold distance d2 from the vehicle 10 and the authentication system 103 determining that the user 20 is authorized to access the vehicle 10, cause one or more doors 12 of the vehicle 10 to unlock and/or open.

In some examples as the user 20 approaches the vehicle 10, the user device controller 105 may be configured to, based on e.g., data provided by the distance determiner 115, 116, cause the user device 30 to provide one or more additional indication 32, such as notifications or prompts, related to the vehicle's status, such as confirming that the vehicle 10 is unlocked and/or the doors 12 are opening/opened. The user device controller 105 may be configured to cause the user device 30 to one or more additional indications 32 indicating real-time updates on personalized settings, such as climate control and/or seat adjustments being prepared e.g., according to user preferences. Similarly, as the user 20 leaves the vehicle 10, the user device controller 105 may be configured to provide one or more additional indicators 32 comprising e.g., a notification confirming that the vehicle has been locked, windows and doors are secure, and/or that the ride has ended etc. Additionally, or alternatively, the user device controller 105 may be configured to provide one or more additional indicators 32 comprising indications or alerts to the user 20 if items have been left inside the vehicle, etc. In some examples as the user 20 approaches the vehicle 10, the user device controller 105 may be configured to, based on e.g., data provided by the distance determiner 115, provide one or more additional indication 32 indicating security feedback, such as informing the user 20 if any suspicious activity is detected near the vehicle, traffic conditions, etc.

The system 100 presented with reference to FIG. 2 is shown as associating one user 20 with one vehicle 10. Such association may be provided by the vehicle 10 and the user device 30 sharing credentials associated with the first interface i1. These credentials may be uploaded by the vehicle 10 and user device 30 respectively to the server system 210, and accessed and downloaded by the other. For instance, a user 20 ordering pickup by a vehicle 10 from a pickup service may share their credentials for the first interface i1 with the pickup service. The pickup service may then share the credentials of the user 20 with a selected vehicle 10 and the credentials of the vehicle 10 with the user 20. When the vehicle 10 and the user 20 are within range for communicating across the first interface i1, e.g., within the first distance d1 from each other, vehicle information 125 as described herein may be shared with the user 20.

In some examples, a subset of the vehicle information 125 is provided via the server system 210. For example, the first interface i1 is an UWB interface and the respective transceivers of the vehicle 10 and/or the user device 30 obtain a distance 126 and direction 127 across the first interface i1. These obtained distances 126 and directions 127 may be provided to the server system 210 for further processing before being provided to the vehicle 10 and/or user device 30 as a subset of the vehicle information 125 via the network 200. For instance, in examples wherein the vehicle 10 comprises a plurality of transceivers 11*a-d*, distances 126 and directions 127 provided from each of these transceivers 11*a-d* may be provided to the server system 210 where the data is processed to provided triangulation of the user device 30 and an accurate user location 25 may be obtained by the user device 30 from the server system 210.

It should be mentioned that, although not shown, more than one vehicle 10, e.g., an additional vehicle (sometimes referred to as a second vehicle), may assist in guiding the user 20 towards the specific vehicle 10. For instance, assume that the user 20 is walking along a long line of vehicles in search of one specific vehicle 10. The first localization sensor 101 may be configured to connect to one or more additional vehicles via first interfaces i1 of the additional vehicles. The system 100, or corresponding systems 100 of the additional vehicles, may assist in determining the user location 25 and may track the user 20 by determining additional relative distances and directions between the user 20 and the additional vehicles. These additional relative distances and directions may be shared between the vehicle 10 and the additional vehicles. The system 100 may be configured to determine the user location 25 by triangulating between the relative distances and directions and the distance 126 and direction 127 associated with the specific vehicle 10, this is assuming a respective global position of the vehicle 10 and the additional vehicles is known, and/or relative location of the vehicle 10 and the additional vehicles is known.

In examples with one or more additional vehicles providing additional distances and/or directions, the vehicle controller 106 may be configured to cause an additional vehicle to provide information to the user 20 indicating a direction towards the specific vehicle 10, and/or that the additional vehicle is not accessible to the user 20. Such indications may be provided by causing control of vehicle lighting (interior and/or exterior) and/or control of sounds generated by the additional vehicle. In a specific example, the vehicle controller 106 may be configured to cause interior and/or exterior lighting of an additional vehicle to light up in a red color, and interior and/or exterior lighting of the specific vehicle 10 to light up in a green color. The vehicle controller 106 may be configured to only cause control of the additional vehicle e.g., if the user 20 is at or within the second threshold distance from the additional vehicle, if the user 20 is at or within the first threshold distance from the additional vehicle, if the user 20 is closer to the additional vehicle than the specific vehicle 10 etc.

In examples with additional vehicles, a subset, or all, of the vehicles may obtain credentials for the user device 30 via the server system 210. In some examples, this may comprises providing first interface credentials of the user device to a fleet of vehicles. Additionally, or alternatively, credentials of the fleet of vehicles may be obtained by the user device 30.

The system 100 described in reference to FIG. 2 is, for reasons of brevity, exemplified generally with ingress examples, i.e., a user 20 approaching the vehicle 10. For the avoidance of doubt, it should be mentioned that that the system 100 may be configured to alternatively, or additionally, provide similar or corresponding services during egress. For instance, during egress, the system 100 may be configured to close the doors 12. The doors 12 may be closed based on the user's distance from the vehicle 10. In some examples, the doors 12 may be closed when the user 20 is at or beyond the second distance d2 from the vehicle. Closing of the doors may be controlled based on the prohibited areas 40*a*, 40*b*.

Figure 3:
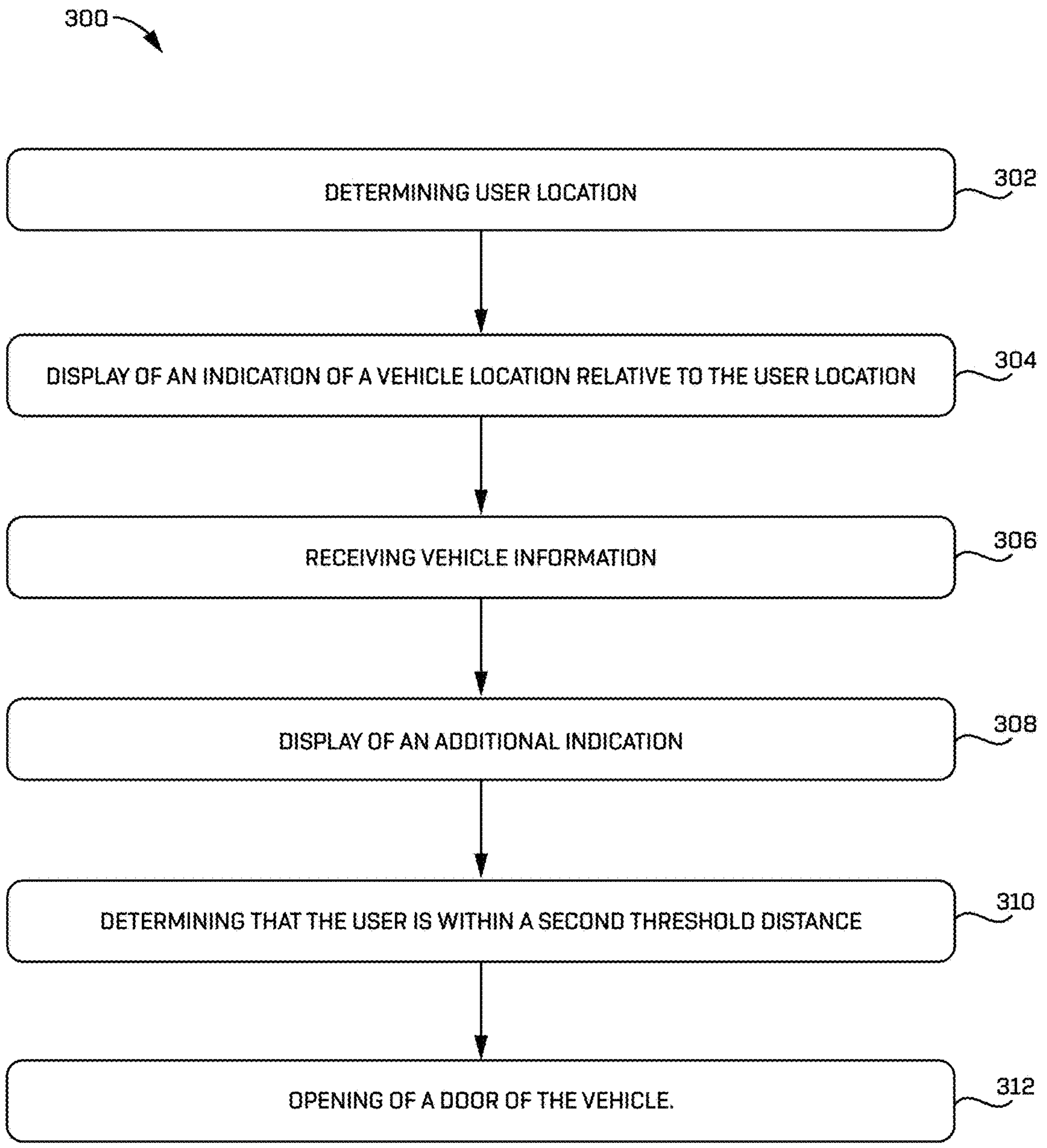
FIG. 3 is an example process for guiding a user toward a vehicle, in accordance with examples of the disclosure.

FIG. 3 depicts an example process 300 of wayfinding in accordance with examples of the disclosure. The process 300 may be performed stand-alone by e.g., a user device 30 communicatively connected to a vehicle 10, a vehicle 10 communicatively connected to a user device 30 or a server system 210 communicatively connected to a user device 30 and/or a vehicle 10. The process 300 may, in some examples, be performed in part by any combination of a user device 30 communicatively connected to a vehicle 10, a vehicle 10 communicatively connected to a user device 30 or a server system 210 communicatively connected to a user device 30 and/or a vehicle 10. In some examples, the process 300 is described by instructions executable by one or more processors, such as the processors 130 introduced with reference to FIG. 2. The instructions may be stored on one or more non-transitory computer-readable media such as the memory 140 introduced in reference to FIG. 2.

The process 300 comprises determining 302 a user location 25. The user location 25 may be determined in accordance with any example, feature or function presented herein, such as those provided by e.g., the user location determiner 112 introduced with reference to FIG. 2. In one example, the user location 25 is determined at least in part based on a global positioning system associated with the user device 30.

The process 300 further comprises causing display 304 of an indication of a vehicle location 15 relative to the user location 25. The causing of the display may be provided in accordance with any example, feature or function presented herein, such as those presented in reference to the user device controller 105.

The process 300 further comprises receiving 306 vehicle information 125. The vehicle information 125 may be received in accordance with any example, feature or function presented herein, such as those exemplified in reference to the vehicle information receiver 120 introduced in FIG. 2. In one example, the vehicle information 125 is received via the first interface i1 based at least in part on the user 20 being at or within the first threshold distance d1 from the vehicle 10. The first interface i1 may be a direct wireless interface as presented herein, and the user 20 may be determined to be at or within the first threshold distance from the vehicle 10 in accordance with any example, feature or function presented herein, such as those presented in reference to the first distance determiner 115 introduced in reference to FIG. 2.

The process 300 further comprises causing the user device 30 to display 308 an additional indication 32. The user device 30 may be caused to display the additional indication based on any example, feature or function presented herein, such as those presented in reference to the user device controller 105 of FIG. 2. In some examples, the additional indication is indicative of the vehicle location 15 relative to an updated user location 25 and a direction to follow for the user 20 to reach the vehicle 10.

The process 300 further determining 310 that the user 20 is at or within the second threshold distance d2 from the vehicle 10. This may be determined based on any example, feature or function presented herein, such as by the second distance determiner 116 presented in reference to FIG. 2.

The process 300 further comprises causing a door 12 of the vehicle 10 to open. This may be caused as described herein in reference to any example, feature or function, such as those presented in reference to the vehicle controller 106 in FIG. 2.

The process 300 presented with reference to FIG. 3 may very well comprise any feature, example or effect presented herein. The process 300 may specifically comprise any details presented in reference to the system 100 of FIG. 2, and the system 100 of FIG. 2 may very well be configured to provide any, or all of the features of the process 300 of FIG. 3.

Figure 4:
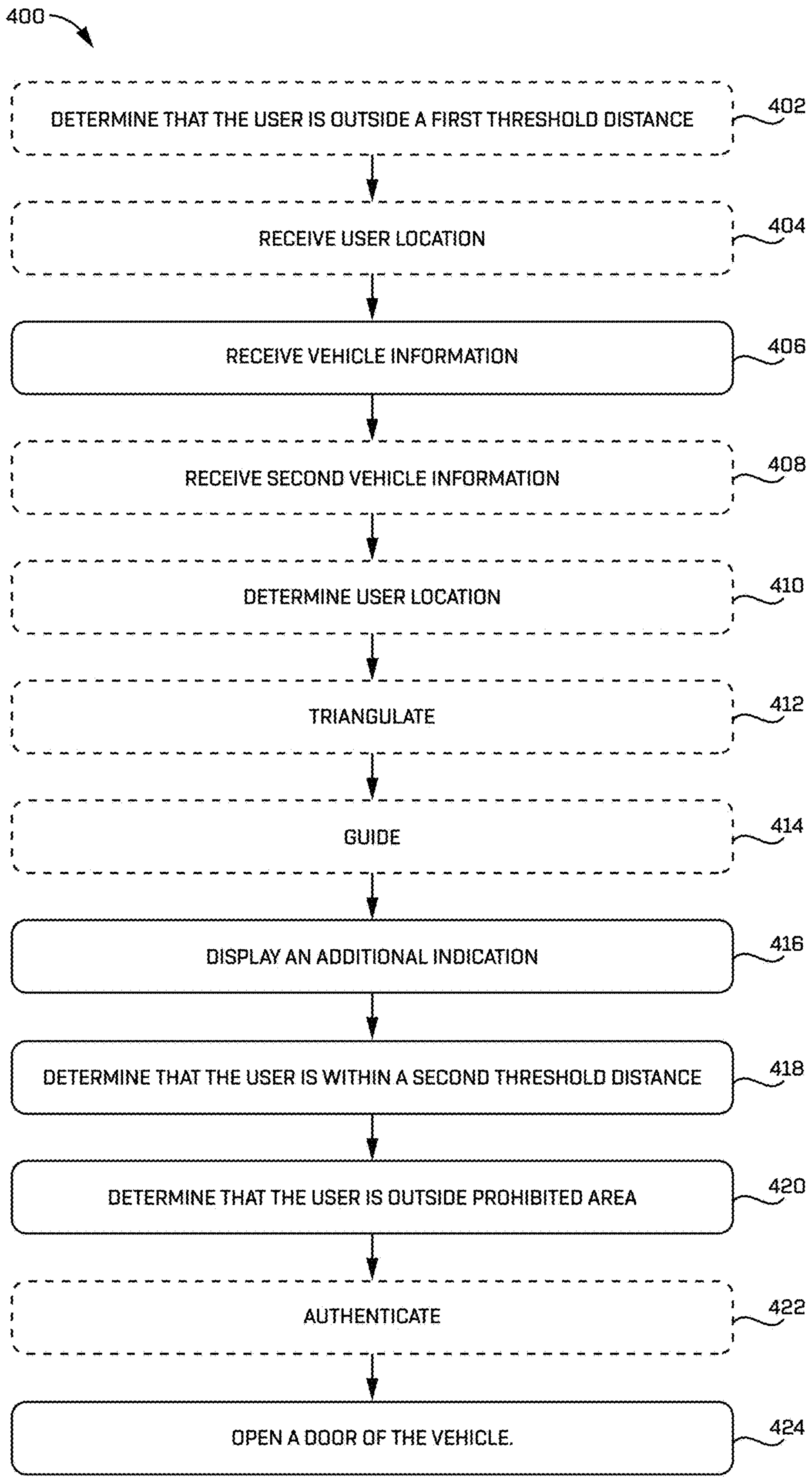
FIG. 4 is an example process for guiding a user toward a vehicle, in accordance with examples of the disclosure.

FIG. 4 depicts an example process 400 of wayfinding in accordance with examples of the disclosure. The process 400 may be performed stand-alone by e.g., a user device 30 communicatively connected to a vehicle 10, a vehicle 10 communicatively connected to a user device 30 or a server system 210 communicatively connected to a user device 30 and/or a vehicle 10. The process 300 may, in some examples, be performed in part by any combination of a user device 30 communicatively connected to a vehicle 10, a vehicle 10 communicatively connected to a user device 30 or a server system 210 communicatively connected to a user device 30 and/or a vehicle 10. In some examples, the process 400 is described by instructions executable by one or more processors, such as the processors 130 introduced with reference to FIG. 2. The instructions may be stored on one or more non-transitory computer-readable media such as the memory 140 introduced in reference to FIG. 2. In FIG. 4, boxes having dashed outlines indicate optional features and solid boxes indicates preferred features of the specific example in FIG. 4.

The process 400 may, in some examples, comprise determining 402, based at least on part on the first localization sensor 101, that the user 20 is outside the first threshold distance d1 from the vehicle 10. The determining may be based on any example, feature or function presented herein, such as by the first distance determiner 115 presented in reference to FIG. 2.

The process 400 may, in some examples, comprise receiving 404 the user location 25 using the second localization sensor 102, the user location 25. Receiving 404 the user location 25 using the second localization sensor 102 may be based on determining 402 that the user 20 is outside the first threshold distance d1 from the vehicle 10. The user location 25 may be received based on any example, feature or function presented herein, such as those presented in reference to the user location determiner 112 in FIG. 2.

The process 400 comprises receiving 406, via the first localization sensor 101 of the user device 30 associated with the user 20 and based at least in part on the user 20 being at or less than a first threshold distance from a vehicle 10, vehicle information 125. The vehicle information 125 comprises a direction 127 between the user device 30 and the vehicle 10. Receiving of the vehicle information 125 may be provided based on any example, feature or function presented herein, such as those presented in reference to the vehicle information receiver 120 introduced in reference to FIG. 2. Determining that the user 20 is at or within the first threshold distance from a vehicle 10 may be based on any example, feature or function presented herein, such as those presented in reference to the first distance determiner 115 in FIG. 2.

The process 400 may, in some examples, comprise receiving 408, via the first localization sensor 101, and based at least in part on the user 20 being at or less than the first threshold distance d1 from a second vehicle, second vehicle information. The second vehicle information comprises a distance between the user device 30 and the second vehicle and a global position of the second vehicle. The second vehicle information may be provided based on any example, feature or function presented herein, such as those presented in reference to the vehicle information receiver 120 introduced in reference to FIG. 2. Determining that the user 20 is at or less than the first threshold distance d1 from the second vehicle may be based on any example, feature or function presented herein, such as by the first distance determiner 115 presented in reference to FIG. 2.

The process 400 may, in some examples, comprise determining 410 the user location 25 based at least in part on the vehicle information 125 and the second vehicle information. This may be provided based on any suitable example, feature or function presented herein, such as those presented in reference to the additional vehicle. Such features may comprise those presented in reference to FIG. 2 such as the vehicle controller 106 which may cause the second vehicle to provide one or more of audible or visual guidance toward the vehicle.

The process 400 may, in some examples wherein the vehicle 10 comprises a plurality of first transceivers 101, i.e., the transceivers 11*a*, 11*b*, 11*c*, 11*d* in FIG. 2, comprise determining, based at least in part on triangulation 412 by the user device 30 of the respective transceiver 11*a*, 11*b*, 11*c*, 11*d* of the vehicle 10, a location of the user 20 in relation to the vehicle 10, i.e., the relative user location. The triangulation may be performed based on any suitable example, feature or function presented herein, such as those presented in reference to FIG. 2. In some examples the transceivers 11*a*, 11*b*, 11*c*, 11*d* are UWB transceivers.

The process 400 may, in some examples, comprises causing, based at least in part on the vehicle information 125, the user device 30 to provide one or more of audible, visual, or haptic guidance 414 toward the vehicle 10. Such guidance and feedback may be provided based on any suitable example, feature or function presented herein, such as those presented in reference to the user device controller 105 in FIG. 2.

The process 400 comprises causing, based at least in part on the vehicle information 125, the user device 30 to display 416 an additional indication 32. The additional indication 32 is indicative of the vehicle location 15 relative to the user location 25 and a directional path to follow for the user 20 to reach the vehicle 10. The additional indication 32, or additional indication 32, may be any information or indication presented herein such as those exemplified in reference to FIG. 1 or FIG. 2. The user device 30 may be controlled e.g., by the user device controller 105 as exemplified in reference to FIG. 2.

The process 400 comprises determining 418, based at least in part on the vehicle information 125, that the user 20 is at or less than a second threshold distance d2 from the vehicle 10. The second threshold distance d2 is shorter than the first threshold distance d1. This determining may be based on any suitable example, feature or function presented herein, such as those presented in reference to the second distance determiner 116 introduced in reference to FIG. 2.

The process 400 comprises determining 420, based at least in part on the vehicle information 125, that user 20 is outside a prohibited area 40*a*, 40*b* of the vehicle 10. Prohibited area 40*a*, 40*b* may be prohibited areas as exemplified in reference to FIG. 2 and the determining may be based on any suitable example, feature or function presented herein, such as those presented in reference to the prohibited area determiner 117 presented in reference to FIG. 2.

The process 400 may, in some examples, comprises providing 422, using the authentication system 103 of the user device 30, user authentication data indicating whether the user 20 is permitted to enter the vehicle 10 or not. The authentication system 103 may be exemplified by an NFC system, an optical authentication system and/or a biometric authentication system. The user authentication data may be comprised in the vehicle information 125. The authentication system 103 and authentication of the user 20 may be performed based on any suitable example, feature or function presented herein, such as those presented in reference to FIG. 1 or FIG. 2.

The process 400 further comprises causing, based at least in part on the user 20 being outside the prohibited area 40*a*, 40*b* and the user 20 being within the second threshold distance d2 from the vehicle 10, opening 424 of a door 12 of the vehicle 10. In some examples, opening 424 the door 12 is further based on whether the user 20 is permitted to enter the vehicle 10, as previously exemplified. Causing the door 12 to open may be performed based on any suitable example, feature or function presented herein, such as those presented in reference to the vehicle controller 106 introduced in reference to FIG. 2.

The process 400 presented with reference to FIG. 4 may very well comprise any feature, example or effect presented herein. The process 400 may specifically comprise any details presented in reference to the system 100 of FIG. 2 or the process 300 of FIG. 3, and the system 100 of FIG. 2 and the process 300 of FIG. 3 may very well be configured to provide any or all of the features of the process 400 of FIG. 4.

Additional Example Vehicle System

Figure 5:
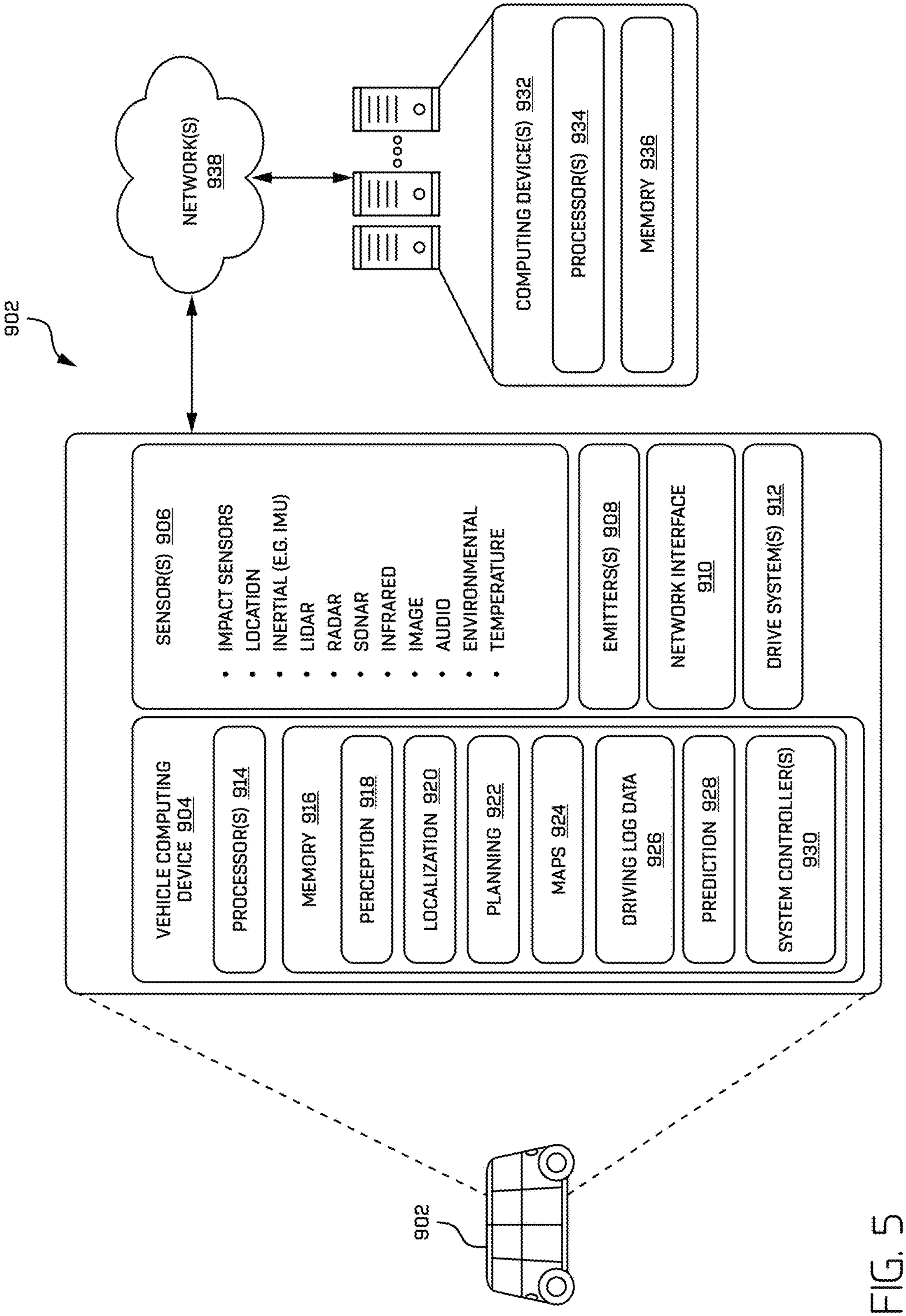
FIG. 5 depicts a block diagram of an example system for implementing the techniques described herein.

FIG. 5 illustrates a block diagram of an example system 900 that implements the techniques discussed herein. FIG. 5 may represent the example implementation of FIG. 2. In some instances, the example system 900 may include a vehicle 902, which may represent the vehicle 10 in FIGS. 1-2. In some instances, the vehicle 902 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 902 may be a fully or partially autonomous vehicle having any other level or classification. Moreover, in some instances, the techniques described herein may be usable by non-autonomous vehicles as well.

The vehicle 902 may include a vehicle computing device(s) 904 (representing computing device(s) 104 in FIG. 2), sensor(s) 906 (representing localization sensors 101, 102 in FIG. 2), emitter(s) 908, network interface(s) 910, and/or drive system(s) 912. The system 900 may additionally or alternatively comprise computing device(s) 932.

In some instances, the sensor(s) 906 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), audio sensors (microphones), wheel encoders, environment sensors (e.g., thermometer, hygrometer, light sensors, pressure sensors, etc.), etc. The sensor(s) 906 may include multiple instances of each of these or other types of sensors. For instance, the radar sensors may include individual radar sensors located at the corners, front, back, sides, and/or top of the vehicle 902. As another example, the cameras may include multiple cameras disposed at various locations about the exterior and/or interior of the vehicle 902. The sensor(s) 906 may provide input to the vehicle computing device(s) 904 and/or to computing device(s) 932. The sensor(s) 906 may be operable to detect a state of the vehicle 902.

The vehicle 902 may also include emitter(s) 908 for emitting light and/or sound, as described above. The emitter(s) 908 may include interior audio and visual emitter(s) to communicate with passengers of the vehicle 902. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 908 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 902 may also include network interface(s) 910 (represented by the network 200, the first interface i1 and the second interface i2 in FIG. 2) that enable communication between the vehicle 902 and one or more other local or remote computing device(s). The network interface(s) 910 may facilitate communication with other local computing device(s) on the vehicle 902 and/or the drive component(s) 912. The network interface(s) 910 may additionally or alternatively allow the vehicle to communicate with other nearby computing device(s) (e.g., other nearby vehicles, traffic signals, etc.). The network interface(s) 910 may additionally or alternatively enable the vehicle 902 to communicate with computing device(s) 932 over a network 938. In some examples, computing device(s) 932 may comprise one or more nodes of a distributed computing system (e.g., a cloud computing architecture).

The vehicle 902 may include one or more drive components 912. In some instances, the vehicle 902 may have a single drive component 912. In some instances, the drive component(s) 912 may include one or more sensors to detect conditions of the drive component(s) 912 and/or the surroundings of the vehicle 902. By way of example and not limitation, the sensor(s) of the drive component(s) 912 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 912. In some cases, the sensor(s) on the drive component(s) 912 may overlap or supplement corresponding systems of the vehicle 902 (e.g., sensor(s) 906).

The drive component(s) 912 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 912 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 912. Furthermore, the drive component(s) 912 may also include one or more communication connection(s) that enable communication by the respective drive component with one or more other local or remote computing device(s).

The vehicle computing device(s) 904 may include processor(s) 914 (representing processor(s) 130 in FIG. 2) and memory 916 (representing memory 140 in FIG. 2) communicatively coupled with the one or more processors 914. Computing device(s) 932 may also include processor(s) 934, and/or memory 936. The processor(s) 914 and/or 934 may be any suitable processor capable of executing instructions to process data and perform operations as described herein. By way of example and not limitation, the processor(s) 914 and/or 934 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 916 (representing memory 140 in FIG. 2) and/or 936 may be examples of non-transitory computer-readable media. The memory 916 and/or 936 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 916 and/or memory 936 may store a perception component 918, localization component 920 (may comprise first and second localization sensors 101, 102 in FIG. 2), planning component 922, map(s) 924, driving log data 926, prediction component 928, and/or system controller(s) 930—zero or more portions of any of which may be hardware, such as GPU(s), CPU(s), and/or other processing units.

The perception component 918 may detect object(s) in in an environment surrounding the vehicle 902 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 918 is referred to as perception data. The perception component 918 may be configured to associate a bounding region (or other indication) with an identified object. The perception component 918 may be configured to associate a confidence score associated with a classification of the identified object with an identified object. In some examples, objects, when rendered via a display, can be colored based on their perceived class. The object classifications determined by the perception component 918 may distinguish between different object types such as, for example, a passenger vehicle, a pedestrian, a bicyclist, motorist, a delivery truck, a semi-truck, traffic signage, and/or the like. The perception component 918 may be operable to detect a state of the vehicle 902.

In at least one example, the localization component 920 may include hardware and/or software to receive data from the sensor(s) 906 to determine a position, velocity, and/or orientation of the vehicle 902 (e.g., one or more of an x-, y-, z-position, roll, pitch, or yaw). For example, the localization component 920 may include and/or request/receive map(s) 924 of an environment and can continuously determine a location, velocity, and/or orientation of the autonomous vehicle 902 within the map(s) 924. In some instances, the localization component 920 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 920 may provide data to various components of the vehicle 902 to determine an initial position of an autonomous vehicle for generating a trajectory and/or for generating map data, as discussed herein. In some examples, localization component 920 may provide, to the perception component 918, a location and/or orientation of the vehicle 902 relative to the environment and/or sensor data associated therewith. The localization component 920 may be operable to detect a state of the vehicle 902.

The planning component 922 may receive a location and/or orientation of the vehicle 902 from the localization component 920 and/or perception data from the perception component 918 and may determine instructions for controlling operation of the vehicle 902 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 930 and/or drive component(s) 912 may parse/cause to be carried out, second instructions for the emitter(s) 908 may be formatted according to a second format associated therewith).

The driving log data 926 may comprise sensor data, perception data, and/or scenario labels collected/determined by the vehicle 902 (e.g., by the perception component 918), as well as any other message generated and or sent by the vehicle 902 during operation including, but not limited to, control messages, error messages, etc. In some examples, the vehicle 902 may transmit the driving log data 926 to the computing device(s) 932.

The prediction component 928 may generate one or more probability maps representing prediction probabilities of possible locations of one or more objects in an environment. For example, the prediction component 928 may generate one or more probability maps for vehicles, pedestrians, animals, and the like within a threshold distance from the vehicle 902. In some examples, the prediction component 928 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 922 may be communicatively coupled to the prediction component 928 to generate predicted trajectories of objects in an environment. For example, the prediction component 928 may generate one or more predicted trajectories for objects within a threshold distance from the vehicle 902. In some examples, the prediction component 928 may measure a trace of an object and generate a trajectory for the object based on observed and predicted behavior. Although prediction component 928 is shown on a vehicle 902 in this example, the prediction component 928 may also be provided elsewhere, such as in a remote computing device. In some examples, a prediction component may be provided at both a vehicle and a remote computing device. These components may be configured to operate according to the same or a similar algorithm.

The memory 916 and/or 936 may additionally or alternatively store a mapping system, a planning system, a ride management system, etc. Although perception component 918 and/or planning component 922 are illustrated as being stored in memory 916, perception component 918 and/or planning component 922 may include processor-executable instructions, machine-learned model(s) (e.g., a neural network), and/or hardware.

As described herein, the localization component 920, the perception component 918, the planning component 922, and/or other components of the system 900 may comprise one or more ML models. For example, the localization component 920, the perception component 918, and/or the planning component 922 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 916 may additionally or alternatively store one or more system controller(s) 930 which may be configured to control steering, propulsion, braking, safety, emitters, communication, and other systems of the vehicle 902. These system controller(s) 930 may communicate with and/or control corresponding systems of the drive component(s) 912 and/or other components of the vehicle 902.

It should be noted that while FIG. 5 is illustrated as a distributed system, in alternative examples, components of the vehicle 902 may be associated with the computing device(s) 932 and/or components of the computing device(s) 932 may be associated with the vehicle 902. That is, the vehicle 902 may perform one or more of the functions associated with the computing device(s) 932, and vice versa.

EXAMPLE CLAUSES

A: A system comprising: one or more processors; and one or more non-transitory computer-readable media storing instructions executable by the one or more processors, wherein the instructions, when executed, cause the system to perform operations comprising: determining, based at least in part on a global positioning system associated with a user device, a user location; causing, based on the user location, the user device to display an indication of a vehicle location relative to the user location; receiving, via a direct wireless interface and based at least in part on the user being at or less than a first threshold distance from the vehicle, vehicle information, wherein the direct wireless interface is a direct interface between the vehicle and the user device, and the vehicle information is indicative of a direction between the user and the vehicle; causing, based at least in part on the vehicle information, the user device to display an additional indication, wherein the additional indication is indicative of the vehicle location relative to an updated user location and a direction to follow for the user to reach the vehicle; determining, based at least in part on the vehicle information, that the user is within a second threshold distance from the vehicle, wherein the second threshold distance is shorter than the first threshold distance; and causing, based at least in part on the user being at or less than the second threshold distance from the vehicle, opening of a door of the vehicle.

B: The system of clause A, wherein the instructions further cause the system to perform actions comprising: determining, based at least in part on the vehicle information, that user is outside a prohibited area of the vehicle; and causing, based at least in part on that that user is outside a prohibited area of the vehicle, opening of the door of the vehicle.

C The system of clause A, wherein the instructions further cause the system to perform actions comprising: providing, using an authentication system of the user device, user authentication data indicating whether the user is permitted to enter the vehicle or not, wherein the authentication system is one or more of a near field communicating system, an optical authentication system and/or a biometric authentication system; and causing, based at least in part on that the user is permitted to enter the vehicle, opening of the door of the vehicle.

D: The system of clause A, wherein the instructions further cause the system to perform actions comprising: determining, based at least in part on the vehicle information, an updated vehicle location; and causing, based at least in part on the vehicle information and the updated vehicle location, the user device to display the additional indication, wherein the additional indication is indicative of the updated vehicle location relative to the updated user location and the directional path to follow for the user to reach the vehicle.

E: The system of clause A, wherein the instructions further cause the system to perform actions comprising: causing, based at least in part on the vehicle information, indication of a door of the vehicle for ingress by the user, wherein the indicating comprises one or more of an audible or visual indication.

F: The system of clause A, wherein the instructions further cause the system to perform actions comprising: causing, based at least in part on the vehicle information, the vehicle to indicate a door of the vehicle prohibited for use by the user to enter the vehicle, wherein the indicating comprises one or more of an audible or visual indication; and causing, based at least in part on the vehicle information, the user device to display the additional indication, wherein the additional indication is indicative of a direction to follow for the user to reach a door of the vehicle for use by the user to enter the vehicle.

G: A method comprising: receiving, via a first localization sensor of a user device associated with a user, and based at least in part on the user being at or less than a first threshold distance from a vehicle, vehicle information, wherein the vehicle information is indicative of a direction between the user device and the vehicle; causing, based at least in part on the vehicle information, the user device to display an additional indication, wherein the additional indication is indicative of a vehicle location relative to a user location and a directional path to follow for the user to reach the vehicle; determining, based at least in part on the vehicle information, that the user is at or less than a second threshold distance from the vehicle, wherein the second threshold distance is shorter than the first threshold distance; determining, based at least in part on the vehicle information, that user is outside a prohibited area of the vehicle; and causing, based at least in part on the user being outside the prohibited area and the user being within the second threshold distance from the vehicle, opening of a door of the vehicle.

H: The method of clause G, wherein the first localization sensor is a transceiver for an ultra-wideband, UWB, interface and the vehicle comprises a plurality UWB devices arranged at predetermined specific locations of the vehicle, the method further comprising: determining, based at least in part on triangulation by the user device of the respective UWB devices, a location of the user in relation to the vehicle.

I: The method of clause G, further comprising: causing, based at least in part on the vehicle information, the user device to provide one or more of audible, visual, or haptic guidance toward the vehicle.

J: The method of clause G, wherein the vehicle information is indicative a location of the vehicle, the method further comprising: receiving, via the first localization sensor, and based at least in part on the user being at or less than the first threshold distance from a second vehicle, second vehicle information, wherein the second vehicle information is indicative of a distance between the user device and the second vehicle and a global position of the second vehicle; and determining, based at least in part on the vehicle information and the second vehicle information, the location of the user.

K: The method of clause J, further comprising: causing, based at least in part on the second vehicle information, the second vehicle to provide one or more of audible or visual guidance toward the vehicle.

L: The method of clause G, further comprising: receiving, using the first localization sensor, an updated vehicle location; and causing, based at least in part on the updated vehicle location, the user device to display the additional indication, wherein the additional indication is indicative of the updated vehicle location relative to the user location and a directional path to follow for the user to reach the vehicle.

M: The method of clause G, further comprising: providing, using an authentication system of the user device, user authentication data indicating whether the user is permitted to enter the vehicle or not, wherein the authentication system is one or more of a near field communicating system, an optical authentication system and/or a biometric authentication system; and causing, based at least in part on that the user is permitted to enter the vehicle, opening of the door of the vehicle.

N: The method of clause G, further comprising determining, based at least in part on the first localization sensor, that the user is outside the first threshold distance from the vehicle; receiving, via a second localization sensor of the user device, and based at least in part on the user being outside the first threshold distance from the vehicle, a location of the user; causing, based at least in part on the location of the user, the user device to display an indication of the vehicle location relative to the user location.

O: The method of clause N, wherein the second localization sensor is a receiver for a global positioning system.

P: One or more non-transitory computer-readable media storing instructions executable by one or more processors, wherein the instructions, when executed, cause the one or more processors to perform operations comprising: receiving, via a first localization sensor of a user device associated with a user, and based at least in part on the user being at or less than a first threshold distance from a vehicle, vehicle information, wherein the vehicle information is indicative of a direction between the user device and the vehicle; causing, based at least in part on the vehicle information, the user device to display an additional indication, wherein the additional indication is indicative of a vehicle location relative to a user location and a directional path to follow for the user to reach the vehicle; determining, based at least in part on the vehicle information, that the user is at or less than a second threshold distance from the vehicle, wherein the second threshold distance is shorter than the first threshold distance; determining, based at least in part on the vehicle information, that user is outside a prohibited area of the vehicle; and causing, based at least in part on the user being outside the prohibited area and the user being within the second threshold distance from the vehicle, opening of a door of the vehicle.

Q: The non-transitory computer-readable media of clause P, wherein the instructions, when executed, cause the one or more processors to perform operations comprising: determining, based at least in part on the first localization sensor, that the user is outside the first threshold distance from the vehicle; receiving, via a second localization sensor of the user device, and based at least in part on the user being outside the first threshold distance from the vehicle, a location of the user; causing, based at least in part on the location of the user, the user device to display an indication of the vehicle location relative to the user location.

R: The non-transitory computer-readable media of clause P, wherein the instructions, when executed, cause the one or more processors to perform operations comprising: causing, based at least in part on the vehicle information, the user device to provide one or more of audible, visual, or haptic guidance toward the vehicle.

S: The non-transitory computer-readable media of clause P, wherein the instructions, when executed, cause the one or more processors to perform operations comprising: receiving, using the first localization sensor, an updated vehicle location; and causing, based at least in part on the updated vehicle location, the user device to display the additional indication, wherein the additional indication is indicative of the updated vehicle location relative to the user location and a directional path to follow for the user to reach the vehicle.

T: The non-transitory computer-readable media of clause P, wherein the first localization sensor is a transceiver for an ultra-wideband, UWB, interface and the vehicle comprises a plurality UWB devices arranged at predetermined specific locations of the vehicle, wherein the instructions, when executed, cause the one or more processors to perform operations comprising: determining, based at least in part on triangulation by the user device of the respective UWB devices, a location of the user in relation to the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, “may,” “could,” “may” or “might,” unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase “at least one of X, Y or Z,” unless specifically stated otherwise, is to be understood to present that an item, term, etc. may be either X, Y, or Z, or any combination thereof, including multiples of each element. Unless explicitly described as singular, “a” means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing instructions executable by the one or more processors, wherein the instructions, when executed, cause the system to perform operations comprising:

determining, based at least in part on a global positioning system associated with a user device, a user location;

causing, based on the user location, the user device to display an indication of a location of a vehicle relative to the user location;

receiving, via a direct wireless interface and based at least in part on the user being at or less than a first threshold distance from the vehicle, vehicle information, wherein the direct wireless interface is a direct interface between the vehicle and the user device, and the vehicle information being indicative of a direction between the user and the vehicle;

causing, based at least in part on the vehicle information, the user device to display an additional indication, wherein the additional indication is indicative of the vehicle location relative to an updated user location and a direction to follow for the user to reach the vehicle;

determining, based at least in part on the vehicle information, that the user is within a second threshold distance from the vehicle, wherein the second threshold distance is shorter than the first threshold distance; and causing, based at least in part on the user being at or less than the second threshold distance from the vehicle, opening of a door of the vehicle.

2. The system of claim 1, wherein the instructions further cause the system to perform actions comprising:

determining, based at least in part on the vehicle information, that user is outside a prohibited area of the vehicle; and causing, based at least in part on that the user is outside a prohibited area of the vehicle, opening of the door of the vehicle.

3. The system of claim 1, wherein the instructions further cause the system to perform actions comprising:

providing, using an authentication system of the user device, user authentication data indicating whether the user is permitted to enter the vehicle or not, wherein the authentication system is one or more of a near field communicating system, an optical authentication system and/or a biometric authentication system; and causing, based at least in part on that the user is permitted to enter the vehicle, opening of the door of the vehicle.

4. The system of claim 1, wherein the instructions further cause the system to perform actions comprising:

determining, based at least in part on the vehicle information, an updated vehicle location; and causing, based at least in part on the vehicle information and the updated vehicle location, the user device to display the additional indication, wherein the additional indication is indicative of the updated vehicle location relative to the updated user location and the directional path to follow for the user to reach the vehicle.

5. The system of claim 1, wherein the instructions further cause the system to perform actions comprising:

causing, based at least in part on the vehicle information, indication of a door of the vehicle for ingress by the user, wherein the indicating comprises one or more of an audible or visual indication.

6. The system of claim 1, wherein the instructions further cause the system to perform actions comprising:

causing, based at least in part on the vehicle information, the vehicle to indicate a door of the vehicle prohibited for use by the user to enter the vehicle, wherein the indicating comprises one or more of an audible or visual indication; and causing, based at least in part on the vehicle information, the user device to display the additional indication, wherein the additional indication is indicative of a direction to follow for the user to reach a door of the vehicle for use by the user to enter the vehicle.

7. A method comprising:

receiving, via a first localization sensor of a user device associated with a user, and based at least in part on the user being at or less than a first threshold distance from a vehicle, vehicle information, wherein the vehicle information is indicative of a direction between the user device and the vehicle;

causing, based at least in part on the vehicle information, the user device to display an additional indication, wherein the additional indication is indicative of a vehicle location relative to a user location and a directional path to follow for the user to reach the vehicle;

determining, based at least in part on the vehicle information, that the user is at or less than a second threshold distance from the vehicle, wherein the second threshold distance is shorter than the first threshold distance;

determining, based at least in part on the vehicle information, that the user is outside a prohibited area of the vehicle; and causing, based at least in part on the user being outside the prohibited area and the user being within the second threshold distance from the vehicle, opening of a door of the vehicle.

8. The method of claim 7, wherein the first localization sensor is a transceiver for an ultra-wideband, UWB, interface and the vehicle comprises a plurality of UWB devices arranged at predetermined specific locations of the vehicle, the method further comprising:

determining, based at least in part on triangulation by the user device of the respective UWB devices, a location of the user in relation to the vehicle.

9. The method of claim 7, further comprising:

causing, based at least in part on the vehicle information, the user device to provide one or more of audible, visual, or haptic guidance toward the vehicle.

10. The method of claim 7, wherein the vehicle information is indicative of a location of the vehicle, the method further comprising:

receiving, via the first localization sensor, and based at least in part on the user being at or less than the first threshold distance from a second vehicle, second vehicle information, wherein the second vehicle information is indicative of a distance between the user device and the second vehicle and a global position of the second vehicle; and determining, based at least in part on the vehicle information and the second vehicle information, the location of the user.

11. The method of claim 10, further comprising:

causing, based at least in part on the second vehicle information, the second vehicle to provide one or more of audible or visual guidance toward the vehicle.

12. The method of claim 7, further comprising:

receiving, using the first localization sensor, an updated vehicle location; and causing, based at least in part on the updated vehicle location, the user device to display the additional indication, wherein the additional indication is indicative of the updated vehicle location relative to the user location and a directional path to follow for the user to reach the vehicle.

13. The method of claim 7, further comprising:

providing, using an authentication system of the user device, user authentication data indicating whether the user is permitted to enter the vehicle or not, wherein the authentication system is one or more of a near field communicating system, an optical authentication system and/or a biometric authentication system; and causing, based at least in part on that the user is permitted to enter the vehicle, opening of the door of the vehicle.

14. The method of claim 7, further comprising determining, based at least in part on the first localization sensor, that the user is outside the first threshold distance from the vehicle;

receiving, via a second localization sensor of the user device, and based at least in part on the user being outside the first threshold distance from the vehicle, a location of the user;

causing, based at least in part on the location of the user, the user device to display an indication of the vehicle location relative to the user location.

15. The method of claim 14, wherein the second localization sensor is a receiver for a global positioning system.

16. One or more non-transitory computer-readable media storing instructions executable by one or more processors, wherein the instructions, when executed, cause the one or more processors to perform operations comprising:

receiving, via a first localization sensor of a user device associated with a user, and based at least in part on the user being at or less than a first threshold distance from a vehicle, vehicle information, wherein the vehicle information is indicative of a direction between the user device and the vehicle;

causing, based at least in part on the vehicle information, the user device to display an additional indication, wherein the additional indication is indicative of a vehicle location relative to a user location and a directional path to follow for the user to reach the vehicle;

determining, based at least in part on the vehicle information, that the user is at or less than a second threshold distance from the vehicle, wherein the second threshold distance is shorter than the first threshold distance;

determining, based at least in part on the vehicle information, that the user is outside a prohibited area of the vehicle; and causing, based at least in part on the user being outside the prohibited area and the user being within the second threshold distance from the vehicle, opening of a door of the vehicle.

17. The non-transitory computer-readable media of claim 16, wherein the instructions, when executed, cause the one or more processors to perform operations comprising:

determining, based at least in part on the first localization sensor, that the user is outside the first threshold distance from the vehicle;

receiving, via a second localization sensor of the user device, and based at least in part on the user being outside the first threshold distance from the vehicle, a location of the user;

causing, based at least in part on the location of the user, the user device to display an indication of the vehicle location relative to the user location.

18. The non-transitory computer-readable media of claim 16, wherein the instructions, when executed, cause the one or more processors to perform operations comprising:

causing, based at least in part on the vehicle information, the user device to provide one or more of audible, visual, or haptic guidance toward the vehicle.

19. The non-transitory computer-readable media of claim 16, wherein the instructions, when executed, cause the one or more processors to perform operations comprising:

receiving, using the first localization sensor, an updated vehicle location; and causing, based at least in part on the updated vehicle location, the user device to display the additional indication, wherein the additional indication is indicative of the updated vehicle location relative to the user location and a directional path to follow for the user to reach the vehicle.

20. The non-transitory computer-readable media of claim 16, wherein the first localization sensor is a transceiver for an ultra-wideband, UWB, interface and the vehicle comprises a plurality UWB devices arranged at predetermined specific locations of the vehicle, wherein the instructions, when executed, cause the one or more processors to perform operations comprising:

determining, based at least in part on triangulation by the user device of the respective UWB devices, a location of the user in relation to the vehicle.

* * * * *